United States Patent
Psenak et al.

(10) Patent No.: US 10,742,537 B2
(45) Date of Patent: *Aug. 11, 2020

(54) ENFORCING STRICT SHORTEST PATH FORWARDING USING STRICT SEGMENT IDENTIFIERS

(71) Applicant: Cisco Technology, Inc., San Jose, CA (US)

(72) Inventors: Peter Psenak, Bratislava (SK); Robert Hanzl, Ritka (CZ); Clarence Filsfils, Brussels (BE); Ketan Jivan Talaulikar, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,219

(22) Filed: Apr. 15, 2019

(65) Prior Publication Data

US 2019/0312806 A1    Oct. 10, 2019

Related U.S. Application Data

(63) Continuation of application No. 15/165,794, filed on May 26, 2016, now Pat. No. 10,263,881.

(51) Int. Cl.
*H04L 12/26* (2006.01)
*H04L 12/721* (2013.01)
*H04L 12/751* (2013.01)

(52) U.S. Cl.
CPC .............. *H04L 45/12* (2013.01); *H04L 45/02* (2013.01)

(58) Field of Classification Search
None
See application file for complete search history.

(56) References Cited

U.S. PATENT DOCUMENTS

| 5,764,624 A | 6/1998 | Endo |
| 6,032,197 A | 2/2000 | Birdwell |
| 6,147,976 A | 11/2000 | Shand |

(Continued)

FOREIGN PATENT DOCUMENTS

| CN | 1726679 A | 1/2006 |
| CN | 101247253 A | 8/2008 |

(Continued)

OTHER PUBLICATIONS

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

(Continued)

*Primary Examiner* — Phirin Sam
(74) *Attorney, Agent, or Firm* — Campbell Stephenson LLP

(57) ABSTRACT

Various systems and methods for using strict path forwarding. For example, one method involves receiving an advertisement at a node. The advertisement includes a segment identifier (SID). In response to receiving the advertisement, the node determines whether the SID is a strict SID or not. If the SID is a strict SID, the node generates information, such as forwarding information that indicates how to forward packets along a strict shortest path corresponding to the strict SID.

20 Claims, 12 Drawing Sheets

(56) References Cited

U.S. PATENT DOCUMENTS

| | | |
|---|---|---|
| 6,374,303 B1 | 4/2002 | Armitage et al. |
| 6,577,600 B1 | 6/2003 | Bare |
| 6,647,428 B1 | 11/2003 | Bannai et al. |
| 6,963,570 B1 | 11/2005 | Agarwal |
| 7,023,846 B1 | 4/2006 | Andersson et al. |
| 7,031,253 B1 | 4/2006 | Katukam et al. |
| 7,031,607 B1 | 4/2006 | Smith |
| 7,061,921 B1 | 6/2006 | Sheth |
| 7,068,654 B1 | 6/2006 | Joseph et al. |
| 7,072,346 B2 | 7/2006 | Hama |
| 7,088,721 B1 | 8/2006 | Droz et al. |
| 7,154,416 B1 | 12/2006 | Savage |
| 7,174,387 B1 | 2/2007 | Shand et al. |
| 7,180,887 B1 | 2/2007 | Schwaderer |
| 7,260,097 B2 | 8/2007 | Casey |
| 7,286,479 B2 | 10/2007 | Bragg |
| 7,330,440 B1 | 2/2008 | Bryant |
| 7,359,377 B1 | 4/2008 | Kompella et al. |
| 7,373,401 B1 | 5/2008 | Azad |
| 7,420,992 B1 | 9/2008 | Fang |
| 7,430,210 B2 | 9/2008 | Havala et al. |
| 7,463,639 B1 | 12/2008 | Rekhter |
| 7,466,661 B1 | 12/2008 | Previdi et al. |
| 7,471,669 B1 | 12/2008 | Sabesan et al. |
| 7,564,803 B1 | 7/2009 | Minei et al. |
| 7,568,047 B1 | 7/2009 | Aysan |
| 7,577,143 B1 | 8/2009 | Kompella |
| 7,602,778 B2 | 10/2009 | Guichard et al. |
| 7,610,330 B1 | 10/2009 | Quinn |
| 7,773,630 B2 | 8/2010 | Huang et al. |
| 7,817,667 B2 | 10/2010 | Frederiksen et al. |
| 7,885,259 B2 | 2/2011 | Filsfils |
| 7,885,294 B2 | 2/2011 | Patel |
| 7,894,352 B2 | 2/2011 | Kompella et al. |
| 7,894,458 B2 | 2/2011 | Jiang |
| 7,903,554 B1 | 3/2011 | Manur |
| 7,940,695 B1 | 5/2011 | Bahadur et al. |
| 7,983,174 B1 | 7/2011 | Monaghan et al. |
| 8,064,441 B2 | 11/2011 | Wijnands et al. |
| 8,121,126 B1 | 2/2012 | Moisand |
| 8,339,973 B1 | 12/2012 | Pichumani et al. |
| 8,422,514 B1 | 4/2013 | Kothari et al. |
| 8,542,706 B2 | 9/2013 | Wang et al. |
| 8,611,335 B1 | 12/2013 | Wu |
| 8,619,817 B1 | 12/2013 | Everson |
| 8,630,167 B2 | 1/2014 | Ashwood Smith |
| 8,711,883 B2 | 4/2014 | Kang |
| 8,792,384 B2 | 7/2014 | Banerjee et al. |
| 8,848,728 B1 | 9/2014 | Revah |
| 8,923,292 B2 | 12/2014 | Friskney |
| 8,953,590 B1 | 2/2015 | Aggarwal |
| 9,036,474 B2 | 5/2015 | Dibirdi et al. |
| 9,049,233 B2 | 6/2015 | Frost et al. |
| 9,094,337 B2 | 7/2015 | Bragg |
| 9,112,734 B2 | 8/2015 | Edwards et al. |
| 9,118,572 B2 | 8/2015 | Sajassi |
| 9,319,312 B2 | 4/2016 | Filsfils et al. |
| 9,571,349 B2 | 2/2017 | Previdi et al. |
| 9,596,169 B2 * | 3/2017 | Choudhury ............ H04L 41/12 |
| 9,660,897 B1 | 5/2017 | Gredler |
| 9,749,227 B2 | 8/2017 | Frost et al. |
| 9,923,798 B1 * | 3/2018 | Bahadur ................ H04L 45/00 |
| 10,263,881 B2 * | 4/2019 | Psenak .................. H04L 45/02 |
| 2001/0037401 A1 | 11/2001 | Soumiya |
| 2001/0055311 A1 | 12/2001 | Trachewsky |
| 2002/0103732 A1 | 8/2002 | Bundy et al. |
| 2003/0016678 A1 | 1/2003 | Maeno |
| 2003/0026271 A1 | 2/2003 | Erb et al. |
| 2003/0126272 A1 | 7/2003 | Corl et al. |
| 2003/0133412 A1 | 7/2003 | Iyer |
| 2003/0142674 A1 | 7/2003 | Casey |
| 2003/0142685 A1 | 7/2003 | Bare |
| 2003/0231634 A1 | 12/2003 | Henderson |
| 2004/0160958 A1 | 8/2004 | Oh |
| 2004/0174879 A1 | 9/2004 | Basso et al. |
| 2004/0190527 A1 | 9/2004 | Okura |
| 2004/0196840 A1 | 10/2004 | Amrutur et al. |
| 2004/0202158 A1 | 10/2004 | Takeno |
| 2004/0240442 A1 | 12/2004 | Grimminger |
| 2005/0073958 A1 | 4/2005 | Atlas |
| 2005/0105515 A1 | 5/2005 | Reed |
| 2005/0157724 A1 | 7/2005 | Montuno |
| 2005/0213513 A1 | 9/2005 | Ngo |
| 2005/0259655 A1 | 11/2005 | Cuervo et al. |
| 2006/0002304 A1 | 1/2006 | Ashwood-Smith |
| 2006/0013209 A1 | 1/2006 | Somasundaram |
| 2006/0056397 A1 | 3/2006 | Aizu |
| 2006/0075134 A1 | 4/2006 | Aalto |
| 2006/0080421 A1 | 4/2006 | Hu |
| 2006/0092940 A1 | 5/2006 | Ansari |
| 2006/0146696 A1 | 7/2006 | Li |
| 2006/0187817 A1 | 8/2006 | Charzinski |
| 2006/0262735 A1 | 11/2006 | Guichard |
| 2006/0274716 A1 | 12/2006 | Oswal et al. |
| 2007/0019647 A1 | 1/2007 | Roy et al. |
| 2007/0041345 A1 | 2/2007 | Yarvis et al. |
| 2007/0053342 A1 | 3/2007 | Siereki |
| 2007/0058638 A1 | 3/2007 | Guichard et al. |
| 2007/0189291 A1 | 8/2007 | Tian |
| 2007/0245034 A1 | 10/2007 | Retana |
| 2008/0002699 A1 | 1/2008 | Rajsic |
| 2008/0049610 A1 | 2/2008 | Linwong |
| 2008/0075016 A1 | 3/2008 | Ashwood-Smith |
| 2008/0075117 A1 | 3/2008 | Tanaka |
| 2008/0084881 A1 | 4/2008 | Dharwadkar et al. |
| 2008/0101227 A1 | 5/2008 | Fujita et al. |
| 2008/0101239 A1 | 5/2008 | Goode |
| 2008/0172497 A1 | 7/2008 | Mohan et al. |
| 2008/0189393 A1 | 8/2008 | Wagner |
| 2008/0192762 A1 | 8/2008 | Kompella et al. |
| 2008/0212465 A1 | 9/2008 | Yan |
| 2008/0225864 A1 | 9/2008 | Aissaoui et al. |
| 2008/0253367 A1 | 10/2008 | Ould-Brahim |
| 2008/0259820 A1 | 10/2008 | White et al. |
| 2008/0316916 A1 | 12/2008 | Tazzari |
| 2009/0003349 A1 | 1/2009 | Havemann |
| 2009/0003364 A1 | 1/2009 | Fendick |
| 2009/0041038 A1 | 2/2009 | Martini et al. |
| 2009/0049194 A1 | 2/2009 | Csaszar |
| 2009/0067445 A1 | 3/2009 | Diguet |
| 2009/0080431 A1 | 3/2009 | Rekhter |
| 2009/0135815 A1 | 5/2009 | Pacella |
| 2009/0196289 A1 | 8/2009 | Shankar |
| 2009/0247157 A1 | 10/2009 | Yoon |
| 2009/0296710 A1 | 12/2009 | Agrawal |
| 2010/0063983 A1 | 3/2010 | Groarke et al. |
| 2010/0088717 A1 | 4/2010 | Candelore et al. |
| 2010/0124231 A1 | 5/2010 | Kompella |
| 2010/0142548 A1 | 6/2010 | Sheth |
| 2010/0220739 A1 | 9/2010 | Ishiguro |
| 2010/0232435 A1 | 9/2010 | Jabr |
| 2010/0272110 A1 | 10/2010 | Allan et al. |
| 2010/0284309 A1 | 11/2010 | Allan et al. |
| 2010/0329153 A1 | 12/2010 | Xu |
| 2011/0021193 A1 | 1/2011 | Hong |
| 2011/0060844 A1 | 3/2011 | Allan et al. |
| 2011/0063986 A1 | 3/2011 | Denechaeu |
| 2011/0090913 A1 | 4/2011 | Kim |
| 2011/0149973 A1 | 6/2011 | Esteve Rothenberg |
| 2011/0228780 A1 | 9/2011 | Ashwood-Smith |
| 2011/0261722 A1 | 10/2011 | Awano |
| 2011/0268114 A1 | 11/2011 | Wijnands et al. |
| 2011/0280123 A1 | 11/2011 | Wijnands et al. |
| 2011/0286452 A1 | 11/2011 | Balus |
| 2012/0044944 A1 | 2/2012 | Kotha et al. |
| 2012/0063526 A1 | 3/2012 | Xiao |
| 2012/0069740 A1 | 3/2012 | Lu et al. |
| 2012/0069845 A1 | 3/2012 | Carney et al. |
| 2012/0075988 A1 | 3/2012 | Lu |
| 2012/0082034 A1 | 4/2012 | Vasseur |
| 2012/0099861 A1 | 4/2012 | Zheng |
| 2012/0106560 A1 | 5/2012 | Gumaste |
| 2012/0120808 A1 | 5/2012 | Nandagopal et al. |
| 2012/0170461 A1 | 7/2012 | Long |

(56) References Cited

U.S. PATENT DOCUMENTS

| | | |
|---|---|---|
| 2012/0179796 A1 | 7/2012 | Nagaraj |
| 2012/0213225 A1 | 8/2012 | Subramanian et al. |
| 2012/0218884 A1 | 8/2012 | Kini |
| 2012/0236860 A1 | 9/2012 | Kompella et al. |
| 2012/0243539 A1 | 9/2012 | Keesara |
| 2012/0287818 A1 | 11/2012 | Corti et al. |
| 2012/0300774 A1* | 11/2012 | Casey .............. H04L 12/462 370/390 |
| 2012/0307629 A1 | 12/2012 | Vasseur |
| 2013/0003728 A1 | 1/2013 | Kwong et al. |
| 2013/0051237 A1 | 2/2013 | Ong |
| 2013/0077476 A1 | 3/2013 | Enyedi |
| 2013/0077624 A1 | 3/2013 | Keesara et al. |
| 2013/0077625 A1 | 3/2013 | Khera |
| 2013/0077626 A1 | 3/2013 | Keesara et al. |
| 2013/0114402 A1 | 5/2013 | Ould-Brahim |
| 2013/0142052 A1 | 6/2013 | Burbidge |
| 2013/0188634 A1 | 7/2013 | Magee |
| 2013/0219034 A1 | 8/2013 | Wang et al. |
| 2013/0258842 A1 | 10/2013 | Mizutani |
| 2013/0266012 A1 | 10/2013 | Dutta et al. |
| 2013/0266013 A1 | 10/2013 | Dutta et al. |
| 2013/0308948 A1 | 11/2013 | Swinkels |
| 2013/0322449 A1 | 12/2013 | Hwang |
| 2013/0343204 A1 | 12/2013 | Geib et al. |
| 2014/0010074 A1 | 1/2014 | Ye |
| 2014/0044036 A1 | 2/2014 | Kim |
| 2014/0092738 A1* | 4/2014 | Grandhi .............. H04L 47/52 370/235 |
| 2014/0160925 A1 | 6/2014 | Xu |
| 2014/0169370 A1 | 6/2014 | Filsfils et al. |
| 2014/0177638 A1 | 6/2014 | Bragg et al. |
| 2014/0189156 A1 | 7/2014 | Morris |
| 2014/0192677 A1 | 7/2014 | Chew |
| 2014/0254596 A1 | 9/2014 | Filsfils et al. |
| 2014/0269266 A1 | 9/2014 | Filsfils et al. |
| 2014/0269421 A1 | 9/2014 | Previdi et al. |
| 2014/0269422 A1 | 9/2014 | Filsfils et al. |
| 2014/0269698 A1 | 9/2014 | Filsfils et al. |
| 2014/0269699 A1 | 9/2014 | Filsfils et al. |
| 2014/0269721 A1 | 9/2014 | Bashandy et al. |
| 2014/0269725 A1 | 9/2014 | Filsfils et al. |
| 2014/0269727 A1 | 9/2014 | Filsfils et al. |
| 2014/0286195 A1 | 9/2014 | Fedyk |
| 2014/0317259 A1 | 10/2014 | Previdi et al. |
| 2014/0369356 A1 | 12/2014 | Bryant et al. |
| 2015/0016304 A1* | 1/2015 | Unbehagen, Jr. ... H04L 12/4662 370/254 |
| 2015/0023328 A1 | 1/2015 | Thubert et al. |
| 2015/0030020 A1 | 1/2015 | Kini |
| 2015/0109902 A1 | 4/2015 | Kumar |
| 2015/0249587 A1 | 9/2015 | Kozat |
| 2015/0256456 A1 | 9/2015 | Previdi et al. |
| 2015/0263940 A1 | 9/2015 | Kini |
| 2015/0319086 A1 | 11/2015 | Tripathi |
| 2015/0326675 A1* | 11/2015 | Kini .............. H04L 43/10 709/224 |
| 2015/0334006 A1 | 11/2015 | Shao |
| 2015/0381406 A1 | 12/2015 | Francois |
| 2016/0006614 A1 | 1/2016 | Zhao |
| 2016/0021000 A1 | 1/2016 | Previdi et al. |
| 2016/0034209 A1 | 2/2016 | Nanduri |
| 2016/0034370 A1 | 2/2016 | Nanduri |
| 2016/0119159 A1 | 4/2016 | Zhao |
| 2016/0119229 A1* | 4/2016 | Zhou .............. H04L 12/4633 370/392 |
| 2016/0127142 A1 | 5/2016 | Tian |
| 2016/0173366 A1 | 6/2016 | Saad |
| 2016/0191372 A1 | 6/2016 | Zhang |
| 2016/0254987 A1 | 9/2016 | Eckert et al. |
| 2016/0254988 A1 | 9/2016 | Eckert et al. |
| 2016/0254991 A1 | 9/2016 | Eckert et al. |
| 2016/0352654 A1 | 12/2016 | Filsfils et al. |
| 2017/0019330 A1 | 1/2017 | Filsfils et al. |
| 2017/0104673 A1 | 4/2017 | Bashandy et al. |
| 2017/0111277 A1 | 4/2017 | Previdi et al. |
| 2017/0302561 A1 | 10/2017 | Filsfils et al. |
| 2017/0302571 A1 | 10/2017 | Frost et al. |
| 2017/0346737 A1 | 11/2017 | Previdi et al. |
| 2017/0366453 A1 | 12/2017 | Previdi et al. |
| 2018/0077051 A1 | 3/2018 | Nainar |
| 2018/0083871 A1 | 3/2018 | Filsfils |
| 2018/0324090 A1* | 11/2018 | Duncan .............. H04L 45/50 |
| 2019/0097925 A1 | 3/2019 | Previdi et al. |
| 2019/0222483 A1 | 7/2019 | Bashandy et al. |
| 2019/0349303 A1 | 11/2019 | Previdi et al. |

FOREIGN PATENT DOCUMENTS

| | | |
|---|---|---|
| CN | 101399688 A | 4/2009 |
| CN | 101496357 A | 7/2009 |
| CN | 101616466 A | 12/2009 |
| CN | 101803293 A | 8/2010 |
| CN | 101841442 A | 9/2010 |
| CN | 101931548 A | 12/2010 |
| CN | 102098222 A | 6/2011 |
| CN | 102132533 A | 7/2011 |
| CN | 102299852 A | 12/2011 |
| CN | 102498694 A | 6/2012 |
| CN | 102714625 A | 10/2012 |
| WO | WO 2008/021195 A1 | 2/2008 |

OTHER PUBLICATIONS

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya, N., "Segment Routing Implications on BFD"; Sep. 9, 2013; 3 pages.

Alcatel-Lucent, "Segment Routing and Path Computation Element—Using Traffic Engineering to Optimize Path Placement and Efficiency in IP/MPLS Networks"; Technology White Paper; 2015; 28 pages.

Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.

Awduche, Daniel O., et al., "RSVP-TE: Extensions to RSVP for LSP Tunnels," Network Working Group, Internet-Draft, Aug. 2000, pp. 1-12.

Awduche, Daniel O., et al., "RSVP-TE: Extensions to RSVP for LSP Tunnels," Network Working Group, Request for Comments 3209, Dec. 2001, pp. 1-61.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Backes, P. and Rudiger Geib, "Deutsche Telekom AG's Statement About IPR Related to Draft-Geig-Spring-OAM-Usecase-01," Feb. 5, 2014, pp. 1-2.

(56) References Cited

OTHER PUBLICATIONS

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Cisco Systems, Inc., "Introduction to Intermediate System-to-Intermediate System Protocol," published 1992-2002; pp. 1-25.

Crabbe, E. et al., "PCEP Extensions for MPLS-TE LSP Protection with Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pce-stateful-pce-mpls-te-00; Network Working Group, Internet-Draft, Oct. 15, 2012, pp. 1-15.

Deering, S., et al., Cisco, Internet Protocol, Version 6 (IPv6) Specification, Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Eckert, Toerless et al., "Traffic Engineering for Bit Indexed Explicit Replication"; U.S. Appl. No. 16/457,339, filed Jun. 28, 2019; consisting of Specification, Claims, Abstract, and Drawings (88 pages).

Farrel, A., et al., Old Dog Consulting, A Path Computation Element (PCA)—Based Architecture, Network Working Group, Request for Comments 4655, Aug. 2006, pp. 1-80.

Farrel, A., et al., Old Dog Consulting, Inter-Domain MPLS and GMPLS Traffic Engineering—Resource Reservation Protocol-Traffic Engineering (RSVP-TE) Extensions, Network Working Group, Request for Comments 5151, Feb. 2008, pp. 1-25.

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, Jun. 28, 2013; pp. 1-28.

Filsfils, C., et al., Cisco Systems, Inc., "Segment Routing Architecture"; draft-filsfils-rtgwg-segment-routing-01, Network Working Group, Internet-Draft, Oct. 21, 2013, pp. 1-28.

Filsfils, C. et al., Cisco Systems, Inc., "Segment Routing Interoperability with LDP"; draft-filsfils-spring-segment-routing-ldp-interop-01.txt; Apr. 18, 2014, pp. 1-16.

Filsfils, C. et al., "Segment Routing Architecture"; draft-ietf-spring-segment-routing-07; Network Working Group, Internet-Draft; Dec. 15, 2015; pp. 1-24.

Filsfils, C. et al.; "Segment Routing Use Cases"; draft-filsfils-rtgwg-segment-routing-use-cases-01; Network Working Group; Internet-Draft; Jul. 14, 2013; pp. 1-46.

Filsfils, C. et al., "Segment Routing Use Cases", draft-filsfils-rtgwg-segment-routing-use-cases-02; Network Working Group, Internet-Draft; Oct. 21, 2013; pp. 1-36.

Filsfils, C. et al., "Segment Routing with MPLS Data Plane", draft-ietf-spring-segment-routing-mpls-05; Network Working Group; Internet-Draft; Jul. 6, 2016; 15 pages.

Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.

Frost, D., et al., Cisco Systems, Inc., "MPLS Generic Associated Channel (G-Ach) Advertisement Protocol," Request for Comments 7212, Jun. 2014, pp. 1-23.

Geib, R., "Segment Routing Based OAM Use Case," IETF 87, Berlin, Jul./Aug. 2013, pp. 1-3.

Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-7.

Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.

Gredler, H., et al., Juniper Networks, Inc., "Advertising MPLS Labels in IS-IS draft-gredler-isis-label-advertisement-00," Internet-Draft; Apr. 5, 2013; pp. 1-13.

Gredler, H. et al., hannes@juniper.net, IETF87, Berlin, "Advertising MPLS LSPs in the IGP," draft-gredler-ospf-label-advertisement, May 21, 2013; pp. 1-14.

Guilbaud, Nicolas and Ross Cartlidge, "Google—Localizing Packet Loss in a Large Complex Network," Feb. 5, 2013, pp. 1-43.

Imaizumi, H., et al.; Networks, 2005; "FMEHR: An Alternative Approach to Multi-Path Forwarding on Packed Switched Networks," pp. 196-201.

Kompella, K. et al, Juniper Networks, "Label Switched Paths (LSP) Hierarchy with Generalized Multi-Protocol Label Switching (GMPLS) Traffic Engineering (TE)," Network Working Group, Request for Comments 4206, Oct. 2005, pp. 1-14.

Kompella, K., et al., Juniper Networks, Inc., "Detecting Multi-Protocol Label Switched (MPLS) Data Plane Failures," Network Working Group, Request for Comments 4379, Feb. 2006, pp. 1-50.

Kompella, K. et al., Juniper Networks, "Virtual Private LAN Service (VPLS) Using BGP for Auto-Discovery and Signaling," Network Working Group, Request for Comments 4761, Jan. 2007, pp. 1-28.

Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.

Kumar, N. et al, "Label Switched Path (LSP) Ping/Trace for Segment Routing Networks Using MPLS Dataplane," draft-kumarkini-mpls-spring-lsp-ping-00; Network Work Group; Internet-Draft; Jan. 2, 2014, pp. 1-15.

Kumar, N. et al, "OAM Requirements for Segment Routing Network"; draft-kumar-spring-sr-oam-requirement-00; Spring; Internet-Draft; Feb. 14, 2014; 6 pages.

Kumar, N. et al, "OAM Requirements for Segment Routing Network"; draft-kumar-spring-sr-oam-requirement-01;Spring; Internet-Draft; Jul. 1, 2014; 6 pages.

Kumar, N. et al, "OAM Requirements for Segment Routing Network"; draft-kumar-spring-sr-oam-requirement-02; Spring; Internet-Draft; Dec. 31, 2014; 6 pages.

Kumar, N. et al, "OAM Requirements for Segment Routing Network"; draft-kumar-spring-sr-oam-requirement-03; Spring; Internet-Draft; Mar. 9, 2015; 6 pages.

Kumar, N. et al., "Label Switched Path (LSP) Ping/Trace for Segment Routing Networks Using MPLS Dataplane," draft-ietf-mpls-spring-lsp-ping-00; Network Work Group; Internet Draft; May 10, 2016; 17 pages.

Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.

Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.

Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.

Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

(56) References Cited

OTHER PUBLICATIONS

Previdi, Stefano et al.; "Segment Routing: PCE Driven Dynamic Setup of Forwarding Adjacencies and Explicit Path"; U.S. Appl. No. 15/394,169, filed Oct. 11, 2019; consisting of Specification, Claims, Abstract, and Drawings (31 pages).

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

Raszuk, R., NTT 13, "MPLS Domain Wide Labels," draft-raszuk-mpls-domain-wide-labels-00, MPLS Working Group, Internet-Draft, Jul. 14, 2013, pp. 1-6.

Rosen, E. et al., Cisco Systems, Inc., "BGP/MPLS VPNs", Network Working Group, Request for Comments: 2547; Mar. 1999, pp. 1-26.

Rosen, E. et al., Cisco Systems, Inc., "Multiprotocol Label Switching Architecture", Network Working Group, Request for Comments: 3031; Jan. 2001, pp. 1-61.

Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.

Li, T., et al., Redback Networks, Inc., "IS-IS Extensions for Traffic Engineering," Network Working Group, Request for Comments 5305, Oct. 2008, 17 pages.

Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Vasseur, JP, et al.; Cisco Systems, Inc. Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.

Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

* cited by examiner

SR FIB A — 310

| Destination SID | NH | SR Operation | Outgoing SID |
|---|---|---|---|
| 16001 | -- | -- | -- |
| 16002 | B | Next | -- |
| 16003 | B | Continue | 16003 |
| 16004 | B | Continue | 16004 |
| 16005 | B | Continue | 16005 |
| 16006 | B | Push | 16004, 16006 |
| 16101 | -- | -- | -- |
| 16102 | B | Next | 16102 |
| 16103 | B | Continue | 16103 |
| 16104 | B | Continue | 16104 |
| 16105 | B | Continue | 16105 |
| 16106 | B | Continue | 16106 |

*FIG. 3A*

SR FIB D — 350

| Destination SID | NH | SR Operation | Outgoing SID |
|---|---|---|---|
| 16001 | C | Continue | 16001 |
| 16002 | C | Continue | 16002 |
| 16003 | C | Next | -- |
| 16004 | -- | -- | -- |
| 16005 | E | Next | -- |
| 16006 | C | Continue | 16006 |
| 16101 | C | Continue | 16101 |
| 16102 | C | Continue | 16102 |
| 16103 | C | Next | -- |
| 16104 | -- | -- | -- |
| 16105 | E | Next | -- |
| 16106 | E | Continue | 16106 |

*FIG. 3B*

SR FIB A — 315

| Destination SID | NH | SR Operation | Outgoing SID |
|---|---|---|---|
| 16001 | -- | -- | -- |
| 16002 | B | Next | -- |
| 16003 | B | Continue | 16003 |
| 16004 | B | Continue | 16004 |
| 16005 | B | Continue | 16005 |
| 16006 | B | Push | 16104, 16106 |
| 16101 | -- | -- | -- |
| 16102 | B | Next | 16102 |
| 16103 | B | Continue | 16103 |
| 16104 | B | Continue | 16104 |
| 16105 | B | Continue | 16105 |
| 16106 | B | Continue | 16106 |

| T1 |
|---|
| 16003, 24034, 16005 |

| SR Tunnel Forwarding Table A | | | |
|---|---|---|---|
| Destination SID | OIF | SR Operation | Outgoing SID |
| 16001 | -- | -- | -- |
| 16002 | 1 | Next | -- |
| 16003 | 1 | Continue | 16003 |
| 16004 | 1 | Push | T1, 16004 |
| 16005 | 1 | Push | T1 |
| 16006 | 2 | Next | -- |
| 16101 | -- | -- | -- |
| 16102 | 1 | Next | -- |
| 16103 | 1 | Continue | 16103 |
| 16104 | 1 | Continue | 16104 |
| 16105 | 2 | Continue | 16105 |
| 16106 | 2 | Next | -- |

| T1S |
|---|
| 16103, 24034, 16105 |

| SR Strict Tunnel Forwarding Table A | | | |
|---|---|---|---|
| Destination SID | OIF | SR Operation | Outgoing SID |
| 16001 | -- | -- | -- |
| 16002 | 1 | Next | -- |
| 16003 | 1 | Continue | 16003 |
| 16004 | 1 | Push | T1S, 16104 |
| 16005 | 1 | Push | T1S |
| 16006 | 2 | Next | -- |
| 16101 | -- | -- | -- |
| 16102 | 1 | Next | -- |
| 16103 | 1 | Continue | 16103 |
| 16104 | 1 | Continue | 16104 |
| 16105 | 2 | Continue | 16105 |
| 16106 | 2 | Next | -- |

ENFORCING STRICT SHORTEST PATH FORWARDING USING STRICT SEGMENT IDENTIFIERS

CROSS-REFERENCE TO RELATED APPLICATIONS

The present patent application is a continuation of U.S. patent application Ser. No. 15/165,794, filed on May 26, 2016, entitled "Enforcing Strict Shortest Path Forwarding Using Strict Segment Identifiers," and which is incorporated by reference herein in its entirety and for all purposes.

FIELD OF THE INVENTION

This application relates generally to networking and, more specifically, to segment routing.

BACKGROUND

Packet forwarding is a process of relaying packets from one communication link to another by nodes in a network. A packet is a formatted unit of data that typically contains control information and payload data. Control information may include: source and destination IP addresses, error detection codes like checksums, sequencing information, etc. Control information is typically found in packet headers and trailers, with payload data in between. Network nodes may take form in one or more routers, one or more bridges, one or more switches, or any other suitable communications processing device.

Segment routing can be used to forward packets. Segment routing utilizes segments, which commonly act as multi-hop or single-hop paths. Segments are assigned segment identifiers (SIDs). Packets addressed with a given SID typically travel along a shortest path, for example, a shortest path to a network node associated with the SID.

In many cases, there are multiple paths between network nodes. As noted, a network node can calculate the shortest path to another network node and forward packets along the shortest path. However, various concerns sometimes cause packets to be forwarded using paths other than the shortest path between network nodes. For example, traffic engineering (TE) can cause packets to be forwarded along a path other than the shortest path. Policy based routing is also used by network nodes to implement policies that selectively cause packets to take specific paths that may differ from a shortest path. Routing mechanisms such as TE and policy based routing can be useful in a number of contexts. However, such mechanisms can also lead to a number of problems. For example, a policy implemented by one network node may conflict with a policy implemented by another network node, causing one or more of the policy implementations to be ineffective. In another example, operations related to TE cause packet looping or other routing problems. What is needed is a way to prevent and/or address such issues.

BRIEF DESCRIPTION OF THE DRAWINGS

The present disclosure may be better understood, and its numerous objects, features, and advantages made apparent to those skilled in the art by referencing the accompanying drawings.

FIG. 3A is an example forwarding table, according to one embodiment.

FIG. 3B is an example forwarding table, according to one embodiment.

FIG. 3C is an example forwarding table, according to one embodiment.

FIG. 7A shows example forwarding info, according to one embodiment.

FIG. 7B is an example forwarding table, according to one embodiment.

FIG. 7C shows example forwarding info, according to one embodiment.

FIG. 7D is an example forwarding table, according to one embodiment.

DETAILED DESCRIPTION

Overview

Figure 1:
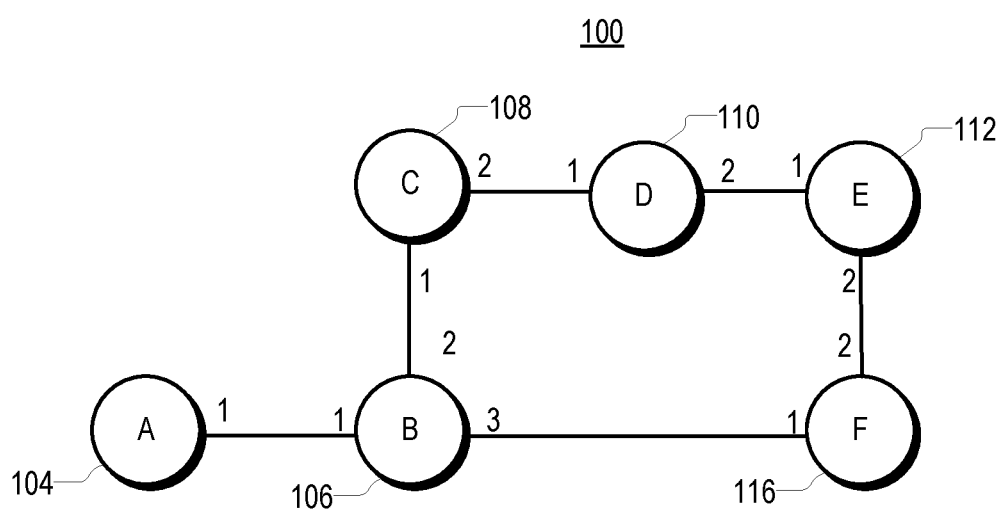
FIG. 1 is a block diagram illustrating an example network, according to one embodiment.

Various systems and methods for using strict path forwarding are described herein. For example, one method involves receiving an advertisement at a node. The advertisement includes a segment identifier (SID). In response to receiving the advertisement, the node determines whether the SID is a strict SID or not. If the SID is a strict SID, the node generates information, such as forwarding information that indicates how to forward packets along a strict shortest path corresponding to the strict SID.

Various protocols exist for forwarding packets. For example, Internet Protocol (IP) routing uses IP addresses inside packet headers to make forwarding decisions. Multiprotocol Label Switching (MPLS) makes forwarding decisions using short path identifiers called labels that are attached to packets. Segment routing (SR) is yet another mechanism that can be employed. SR is similar to MPLS in many regards. For example, forwarding decisions in SR can be based on short path identifiers called segment IDs. However, substantial differences exist between IP, SR, and MPLS as will be more fully described below. For example, SR does not require the additional Label Distribution protocol (LDP) used in traditional MPLS networks or Resource Reservation Protocol for Traffic Engineering (RSVP-TE) signaling to establish paths. As described below, SR enables paths to be established manually or automatically, using various algorithms Segment Routing Segment routing (SR) includes mechanisms by which packets can be forwarded using SR forwarding tables and segment identifiers (SIDs) attached to packets. SR enables very fast and simple forwarding engines in the data plane of SR enabled nodes. SR is not dependent on a particular Open Systems Interconnection (OSI) model data link layer technology to forward packets.

SR nodes (i.e., nodes employing SR) make forwarding decisions based on SIDs. SR can be employed in various environments including, for example, provider networks. Packets entering an SR enabled provider network from, for example, a customer edge (CE) device, do so via an ingress provider edge (PE) node. The packets travel along a segment-switched path (SSP) that includes one or more core nodes, and exit the provider network via an egress PE node. The remaining disclosure will make reference to an autonomous system (AS), which includes at least a portion of a provider network that operates under one administrative domain, although SR can be employed over multiple administrative domains as well. In general a provider network may contain a contiguous set of nodes. Unless otherwise indicated, the nodes referred to herein are considered SR nodes.

SIDs are relatively short, fixed-length identifiers that correspond to segments. Segments can be thought of as instructions a node executes on an incoming packet. For example, a given segment, having a SID associated therewith, can be viewed as an instruction to an SR node to forward the packet that includes the SID along a shortest path towards a destination associated with the SID, or to forward the packet through a specific interface or to a particular service. A SID can be represented, for example, as a multiprotocol label switching (MPLS) label, an index value in an MPLS label space, or an IP address. SIDs may correspond to topological segments of a provider network or services provided by nodes thereof. Topological segments can be one-hop paths to SR nodes, or they can be multi-hop paths to SR nodes. Topological segments act as sub-paths that can be combined to form an SSP. Stacks of SIDs can represent SSPs as will be described below. SSPs can be associated with FECs. Thus, SID stacks may correspond to FECs.

There are several types of SIDs including, but not limited to: prefix SIDs, node SIDs, adjacency SIDs, anycast SIDs, and service SIDs. A prefix SID represents a prefix segment. A prefix segment is a segment attached to an interior gateway protocol (IGP) prefix. A prefix segment represents a shortest path to a prefix or node. A node SID represents a node segment, which is a prefix segment that identifies a specific node. That is, a node SID represents an instruction that causes SR nodes to forward packets along a one-hop or a multi-hop, shortest path within the provider network to an SR node associated with the node SID. Node SIDs are assigned to respective SR nodes within the provider network and are globally unique such that no two SR nodes in the provider network are assigned the same node SID. In one embodiment, all assigned node SIDs are selected from a predefined ID range (e.g., [64, 5000]) for the provider network. The range for node SIDs may be different from a predefined range for labels used, for example, by LDP or RSVP-TE.

Node SIDs can be mapped to unique identifiers. For purposes of explanation only, node SIDs are mapped to respective IP loopback addresses. IP loopback addresses distinguish the SR nodes from each other within the provider network. The loopback addresses can be used by link state protocols such as open shortest path first (OSPF) or intermediate system to intermediate system (IS-IS), or modifications thereof, operating in the control plane of an SR node to identify egress interfaces for shortest paths to respective SR nodes. Once identified, the egress interfaces can be mapped to node SIDs within an SR forwarding table as the SR forwarding table is created or subsequently updated.

An adjacency SID represents a link between adjacent SR nodes. For purposes of explanation only, this disclosure will refer to a link between two directly attached nodes as an adjacency segment (hereafter adjacency). Adjacencies can be uniquely identified in the provider network. This disclosure will presume that only one adjacency exists between nodes in the provider network, it being understood the present disclosure should not be limited thereto. As such, adjacencies are unique in the provider network of this disclosure. Since adjacencies are unique, it follows that adjacency-IDs are likewise unique. Adjacency-IDs should not be confused with adjacency SIDs; adjacency SIDs may not be unique within the provider network domain.

Each SR node can assign a distinct adjacency SID for each of the SR node's adjacencies. Separate SR nodes may assign the same adjacency SID. Adjacency SIDs, however, are locally significant; separate SR nodes may assign the same adjacency SID, but that adjacency SID represents distinct adjacencies. In one embodiment, adjacency SIDs are selected from a predefined range that is outside the predefined range for node SIDs.

An anycast SID represents an anycast segment. An anycast segment identifies a set of nodes, rather than a specific node. Service SIDs correspond to packet services performed by SR nodes such as deep packet inspection (DPI) and/or filtering. Each SR node can assign a distinct service SID for each of the SR node's packet services. For the purposes of explanation only, a node will offer no more than one service. Service SIDs are locally significant. Like adjacency SIDs, separate SR nodes may assign the same service SID for their respective services. Service SIDs can be selected from the same range as the adjacency SIDs, or service SIDs can selected from a predefined range that is distinct from the ranges for adjacency SIDs and/or node SIDs. The service SIDs can be assigned based on service type, it being understood the present disclosure should not be limited thereto. As an example, adjacency SID 5001 is always mapped to deep packet inspection within the provider network, regardless of the node or nodes that perform the service.

SR nodes can advertise their node SIDs, adjacency SIDs, anycast SIDs, service SIDs, and node prefixes to other SR nodes in the provider network using one or more protocols such as an interior gateway protocol (IGP), a border gateway protocol (BGP), or modified versions of such protocols. SR nodes can use the prefix SIDs, node SIDs, adjacency SIDs, anycast SIDs, service SIDs, node prefixes, and/or other information to create or update SR forwarding tables and/or SID stacks.

In one embodiment, SR nodes advertise their node SID/node prefix pairs, adjacency SID/adjacency-ID pairs, and/or service SID/node prefix pairs. The control planes of an SR node can receive and use the node SID/node prefix pairs and a BGP or IGP, such as a link-state protocol (e.g., IS-IS or OSPF), or modified versions thereof, to identify egress interfaces for shortest paths to SR nodes. A shortest path egress interface, once identified, can be mapped to its respective node SID in the node's SR forwarding table. Nodes also map their adjacency SIDs to egress interfaces for respective adjacencies in SR forwarding tables. Because adjacency SIDs are locally significant, however, adjacency SIDs should only be mapped in SR forwarding tables of the nodes that advertise the adjacency SIDs. In other words, an SR node that advertises an adjacency SID/adjacency-ID pair should be the only node in the provider network that has a SR forwarding table that maps the adjacency SID to an egress interface connected to an adjacency identified by the adjacency-ID. Service SIDs are also locally significant and should only be mapped in the nodes in which they are advertised. Unlike adjacency SIDs, however, service SIDs are not mapped to egress interfaces. Rather, the service SIDs are mapped to respective services that can be implemented by the node.

SR nodes can use prefix SIDs, node SIDs, adjacency SIDs, and service SIDs they receive in advertisements from other SR nodes in order to create ordered lists of SIDs (i.e., SID stacks). SID stacks correspond to SSPs, respectively, that forward packets between nodes in the provider network. SIDs in a stack may correspond to respective segments or sub-paths of a corresponding SSP. When an SR source node (e.g., an SR ingress PE node) receives a packet, the SR source node can calculate a FEC for the packet. The SR source node uses the FEC it calculates to select a SID stack mapped thereto. The SR source node can add the selected SID stack to a header, and then attach the header to the packet. The packet with attached stack can traverse the segments of the SSP in an order that corresponds to the list order of the SIDs in the stack. A forwarding engine operating in the data plane of each SR node can use a SID within the stack and an SR forwarding table in order to forward the packet and header to the next node in the SSP. The SR nodes employ a mechanism to designate one of the SIDs in the stack as the active SID. In one embodiment, the top SID in the stack is the active SID. In another embodiment, a pointer to the stack designates the active SID. The active SID is used as a lookup into the SR forwarding table, which includes an instruction and egress interface corresponding to the active SID. As the packet and attached header are forwarded along the SSP, SIDs can be popped off of the top of the stack. In one embodiment, the attached stack of SIDs remains unchanged as the packet is forwarded along the SSP.

In response to receiving a packet with an attached SID stack, an SR node determines whether the active SID of the stack matches the SID assigned to the SR node. If there is a match, the packet has arrived at the destination of the segment associated with the SID. In response to the SR node determining that the active SID is assigned to the SR node, the SR node determines whether the stack includes additional segments. If not, the packet has arrived at the last node in the SSP. Otherwise, the node updates the active SID (e.g., pops the top SID, or increments a pointer to identify an underlying SID). If the packet has not reached the end of the SSP (e.g., the active SID does not correspond to the SR node or there is an underlying SID), the SR node accesses its SR forwarding table to read the egress interface that is mapped to the active SID, and forwards the packet and attached stack via the egress interface.

Specific Path Routing

SR nodes make determinations, based on routing protocols, regarding the paths that packets should follow. Packets are, in many cases, routed along metric-based shortest paths. In some circumstances, it can be determined that packets should not follow the paths prescribed by the routing protocols, but should instead follow alternative paths. For example, a user, such as a network administrator or operator, can determine that packets should avoid a particular link in a path towards a destination, and should instead follow an alternative path to the destination. The alternative path may not be the shortest path to the destination, but the alternative path does not include the particular link, and therefore satisfies the user's objective of avoiding the particular link.

In another example, traffic engineering tunnels are used to forward packets along particular paths. For example, tunnels may be created based on resource availability, to enhance network performance, or based on control plane configuration considerations. When tunnels are used, a user can configure a node to automatically enforce a preference for forwarding packets via a tunnel, regardless of whether or not the tunnel is the shortest path. As used herein, the term specific path routing refers to any static or dynamic routing technique that may cause packets to follow a path other than the shortest path. Examples include traffic engineering, policy based routing, and associated routing techniques.

In one embodiment, policy based routing, also referred to herein as policy routing (PR), involves configuring packet routing and forwarding to achieve or satisfy one or more policy objectives. Such policy objectives can include, for example, avoiding one or more particular nodes and/or links, or ensuring that packets are routed to one or more particular nodes and/or links. PR then involves determining that a specific path should be taken to satisfy the policy objectives, specifying at least a portion of the specific path, updating forwarding information, and forwarding packets along the specific path.

A specific path, as described herein, is a path in which one or more portions of the path is specified, e.g., by a user, or automatically, for example by a path computation element (PCE) server. Instead of relying on the routing protocols to guide packets along a path, e.g., according to shortest path first (SPF) calculations, the user specifies one or more portions of the path. For example, the user can specify that between an ingress node and a destination, packets must be routed to a particular node or nodes. Implementing specific path routing in the context of an SR network (a network having SR nodes forwarding packets according to SR forwarding information) involves configuring SR forwarding information and/or configuration information on one or more SR nodes to accomplish the objective(s) of the policy or policies being implemented. For example, a segment stack can be used to encode a specific path that satisfies the PR requirements or objectives. Specific paths, unlike default paths, sometimes forward packets along paths that differ from the default paths that would be taken in the absence of specific path routing. Default paths are those that are specified by routing protocols, e.g., by an IGP's SPF calculations.

In generating a segment stack, a user, a node or any suitable path computation element (PCE) encodes a desired path through a network using a list of segments that, when traversed by a packet, cause the packet to travel along the desired path. A node SID, such as can be included in a segment stack for an SSP, identifies a particular node, e.g., the node at which the node segment terminates, or is rooted. However, in an example in which the node segment corresponds to a multi-hop path, intermediate nodes along the path need not be specifically identified to forward data along the node segment. Only the destination node associated with the node segment is specified. Traffic is typically forwarded along a shortest path to the destination node. This is highly efficient as a multi-hop path can be identified without specifying each hop of the multi-op path, for example in a packet header. However, this may present challenges in using SR to route packets along a specific path. The shortest path, and thus the set of intermediate nodes traversed by traffic forwarded along the node segment, can change as nodes are added and removed from the network and as other performance characteristics, such as cost associated with various links in the network, change. Therefore, even if a node SID is known, which nodes are traversed by packets forwarded along the node segment may be unknown. Determining which nodes are used to implement a node segment is further complicated by the fact that multiple equal cost paths may exist, and traffic forwarded along the node segment may be shared between the equal cost paths. This relates to the inherent equal cost multi-path (ECMP) property of node segments which enables packets having a unique node SID to be forwarded along multiple alternative equal cost paths.

With SR, intermediate nodes between an ingress node and a destination are not typically specified. Instead, the ingress node specifies the destination by putting the SID corresponding to the destination on a segment stack of a header. The path travelled to the destination is determined by the SPF decisions made by the intermediate nodes along the way. However, with specific path routing, a node can specify one or more of the intermediate nodes between the ingress node and the destination, resulting in a specific path that is different from the default path that would have otherwise been followed to the destination had the SPF decisions by the intermediate nodes been obeyed.

In some cases, traffic should be forwarded via a specific path comprising a predefined set of nodes. There are various reasons why traffic should be forwarded via a specific path. For example, certain nodes may provide services, such as deep packet inspection. Additionally, a specific path may be desired due to service level agreements, traffic engineering concerns, or political reasons. In one embodiment, specific paths can be set up such that each node is along the path is explicitly indicated. In other embodiments, only some of the nodes along a path are explicitly indicated.

In order to ensure that traffic follows a specific path, a list of segments (e.g., node segments and/or adjacency segments) that encodes the specific path is generated (e.g., by a network administrator, a node, or any other PCE). Traffic forwarded from a first node using the list of segments should traverse the specific path. However, it is possible that one or more of the intermediate nodes along the specific path also implements specific path routing and that one or more of the specific path routing implementations of the intermediate node interferes with the specific path established by the first node.

One example of a way in which a specific path can be implemented is by the use of a tunnel, such as a traffic engineering (TE) tunnel. For example, a node can update forwarding information such that packets intended for one or more destinations are forwarded into a tunnel. In the context of SR, this involves appending a segment stack to the packets, where the segment stack defines the path of the tunnel. However, in some cases, a problem occurs that causes the packet to be turned back in the tunnel. For example, if a link along the tunnel's path fails, or the cost associated with traversing the link increases relative to the cost associated with an alternative path, a packet traversing the tunnel may be rerouted by one of the nodes along the tunnel back to the tunnel entrance, or the tunnel head-end node. If the tunnel head-end node is unaware of the problem, the tunnel head-end node forwards the packet back into the tunnel, creating a loop.

Strict SPF Segment Identifiers

Described herein are techniques for forwarding packets using a type of SID known as a strict SID. A strict SID mandates that the shortest path be used for the segment identified by the strict SID. That is, SR nodes that forward a packet according to a strict SID must forward the packet along the shortest path towards a destination associated with the strict SID. This can cause certain local specific path implementations on intermediate nodes to be ignored, such as specific path instructions that would override the shortest path decisions. Strict SIDs can also be used to prevent packet looping, e.g., as in the example described above with regard to tunnels.

FIG. 1 shows an example of a portion of a segment routing (SR) enabled network 100. Network 100 consists of nodes 104-116. Nodes 104-116 are implemented as SR nodes, which are nodes that are configured to employ SR. Each of the nodes 104-116 have interfaces that are identified as shown. For example, node 106 has three interfaces designated 1-3, respectively. In one embodiment, node 104 is configured as an ingress node and node 116 is configured as an egress node. Node 104 and node 116 can be coupled to respective customer edge nodes or to other autonomous systems (not shown).

Each of the nodes 104-116 is assigned a node prefix that is unique within network 100. Node prefixes A-F are provided for nodes 104-116, respectively. These node prefixes are unique within network 100. In one embodiment, a node prefix is implemented as a prefix that is assigned to the loopback interface of the node. Nodes 104-116 can also assign locally significant adjacency segment IDs and/or service segment IDs. Data, such as packets, flow between nodes along segment switched paths (SSPs). An SSP can be represented by a segment list implemented, for example, as a SID stack. The segment list is inserted into a packet's header by, for example, an ingress node, and packets are forwarded along the nodes identified in the segment list. When a specific path is specified for a packet, the specific path is encoded in a segment list.

Nodes 104-116 are assigned unique prefix SIDs. SIDs 16001-16006 are standard prefix SIDS, referred to herein as standard SIDs. Nodes 104-116 are also assigned unique strict prefix SIDs 16101-16106, referred to herein as strict SIDs. Standard SIDs and strict SIDS are unique within network 100, such that each standard SID and each strict SID is assigned to no more than one node and is a different value from every other standard SID and strict SID assigned to nodes in the network 100. Both standard SIDs and strict SIDs can be implemented as node SIDs. In some embodiments, a user, such as a network administrator, detects a node coming online or joining a network and assigns the node a standard prefix SID and a strict SID. In one embodiment, in response to being assigned a standard SID, the node determines if a strict SID has been assigned and advertised. If a strict SID has not been assigned and advertised by the node, the node can perform operations related to doing so, as described below.

In response to being assigned a standard SID, the node advertises the standard SID to other nodes in the network. Likewise, in response to being assigned a strict SID, the node advertises the strict SID to other nodes in the network. The SIDs are advertised, in one embodiment, using IGP. Standard SIDs can be differentiated, in one embodiment, from strict SIDs by the use of a variable that is included in the advertisements of the SIDs. In one embodiment, strict SIDs and standard SIDs determined differently, or can be differentiated by virtue of being selected and assigned from different, non-overlapping ranges.

In one embodiment, in response to a node determining that a standard SID is to be advertised by the node, the node the node generates the advertisement and sets a variable in the algorithm field of the advertisement to a value (e.g., zero) that indicates that the SID is a standard SID. Packets forwarded using a standard SID should be routed by intermediate nodes along the shortest path to the prefix associated with the standard SID. However, local specific path routing decisions implemented by any of the intermediate nodes can override the shortest path decisions. By default, prefix SIDs are standard SIDs. That is, the default value in the algorithm field indicates that local specific path routing can override shortest path routing decisions. To advertise a strict SID, the node generates an advertisement and sets a variable in the algorithm field of the advertisement to a value (e.g., one) that indicates that the advertised SID is a strict SID. If a packet is being forwarded along a path according to a strict SID, intermediate nodes on the path must not use local specific path routing to override shortest path first routing decisions.

In response to receiving advertisements that include SIDs, a node updates routing information and forwarding information. The routing information and forwarding information associate the prefix with the SID(s) advertised for that prefix. An SR node that receives advertisements from other SR nodes can examine the algorithm field of the advertisements to determine whether the SIDs being advertised are strict SIDs or not. The routing information and forwarding information can be used, e.g., by an ingress router, to create an SR header for forwarding a packet to a particular destination. For example, if the ingress router receives a packet from a CE node with an IP prefix in the destination address field, the ingress router can use IGP advertisements to determine which SIDs are associated with the IP prefix. The ingress router can encapsulate the packet with an SR header including a SID corresponding to the IP prefix and forward the packet. Intermediate nodes (e.g., nodes between the ingress router and the node corresponding to the IP prefix) forward packets having such a header towards a destination corresponding to the IP prefix using SR forwarding tables, as discussed below.

Figure 2:
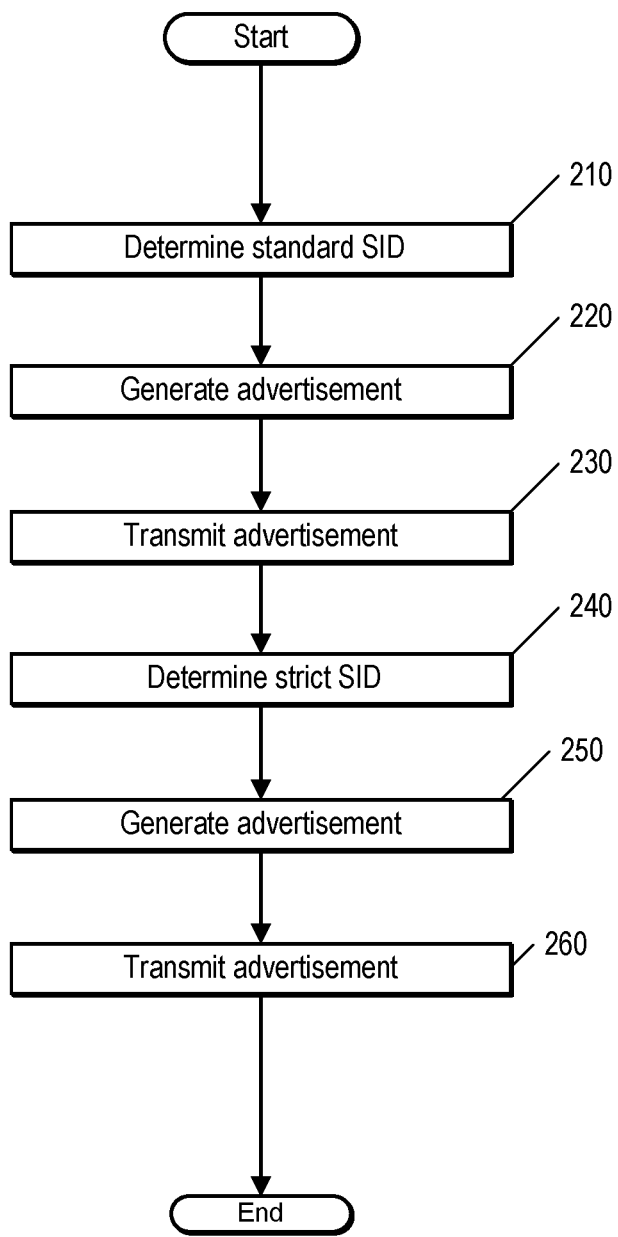
FIG. 2 is a flow chart illustrating an example process, according to one embodiment.

FIG. 2 illustrates a method that is performed, in one embodiment, by a node, such as one of SR enabled nodes 104-116 of FIG. 1. The method involves generation and distribution of SR information, including both strict SIDs and standard SIDs that can be used by SR nodes to determine routing information and forwarding information. For example, using the advertisements described with regard to FIG. 2, SR enabled nodes can populate routing information and forwarding information, such as the forwarding tables described with regard to FIG. 3.

At 210, the SR node determines a standard SID. In one embodiment, a user, such as a network administrator or operator, selects and allocates a standard SID for a given SR node. In another embodiment, the SR node itself allocates a standard SID.

One embodiment can include dynamic assignment of SIDs using a request and response system. In response to determining that an SR node is powered on, joins an AS, reboots, is upgraded to perform SR, or any other such triggering event, the SR node can send a query to a device, for example, a mapping server, requesting a prefix SID. In response, the mapping server responds with an appropriate SID from a predefined ID range. The mapping server maintains a record (e.g., in a data structure in memory, in a file on a hard drive, and the like) that indicates which nodes have been assigned SIDs. If the requesting SR node has not already been assigned a SID, the mapping server selects an unused SID from the ID range, sends a response containing the selected SID, and updates the record to show that the requesting node has been assigned the selected SID. If the requesting SR node has already been assigned a SID (e.g., before being powered down), the mapping server accesses the record to obtain the already-assigned SID and returns that SID to the requesting SR node.

Instead of sending SIDs in response to requests from SR nodes, the mapping server can alternatively identify that a newly-booted SR node needs a SID and assign (and send) that SR node a SID without having first received a request from that SR node. Similarly, a mapping server can identify that an SR node that already has one or more assigned SIDs needs a new SID (e.g., a strict SID) and can thus similarly assign and send the SR node its additional SID.

Each SR node uses an SR global block (SRGB), which is a set of identifiers available to be used as SIDs. In one embodiment, all SR nodes in a provider network use the same SRGB. Selecting a SID can be systematically performed using a selection algorithm. In one embodiment, the mechanism used to select the SID for an SR node depends on the type of SID being used. SIDs can be implemented, for example, as MPLS labels, or IP addresses. Selecting which SID to assign involves, in one embodiment, determining which SID of the available SIDs in the SRGB or in a range of SIDs in the SRGB, has the lowest value, and selecting that SID. In one embodiment, the SR node calculates a SID based on a prefix assigned to the SR node. In another embodiment, the SR node calculates the SID using an index value in a label space used by the SR node. It should be recognized that any other suitable means for selecting an unused SID can be employed by a user, an SR node, or any other appropriate entity The SR node, in one embodiment, determines whether the assigned SID is valid. That is, the SR node determines whether the SID falls within the SRGB range, and is unused by any other node. In one embodiment, if the SR node determines that the SID is not valid, the SR node generates an error warning, and stores the error warning in memory or transmits the error warning, e.g., to the user. In response to determining that the SR node has been assigned a valid SID, the SR node updates its SR forwarding information to indicate that if the SR node receives a packet having a segment stack with the assigned SID in the active position of, the SR node should remove the SID from the segment stack.

At 220, the SR node generates an advertisement that identifies the SID. In one embodiment, generating the advertisement involves configuring one or more fields in the advertisement. For example, if the SID corresponds to a node SID, the SR node sets a flag in the advertisement so indicating. The SR node also ensures that the advertisement, e.g., a value in the algorithm field of the advertisement, correctly identifies whether the SID is a strict SID or a standard SID. For example, if the SID is a standard SID, the node sets the value in the algorithm field to 0.

In one embodiment, SR nodes use a sub-type-length-value (sub-TLV) in an IGP link state packet to advertise SIDs. This sub-TLV includes information identifying the SID being advertised, as well as the type of that SID (e.g., node SID, adjacency SID, or the like). The sub-TLV can also include information (e.g., in the form of a flag) for node SIDs that indicates how to calculate the path identified by that node SID (e.g., using shortest IGP metric, extended latency IGP metric, and the like).

As an example, if SIDs are 20 bits in length, each advertisement can include the 20-bit SID being advertised, followed by a flag vector that can indicate the type of SID and other information. In one embodiment, the flag vector includes one or more of the following flags: a flag indicating whether the SID is unique within the local domain, a flag indicating that the path to the advertising node should be computed based upon a shortest-path IGP metric, a flag indicating that the path to the advertising node should be computed based upon an IGP extended latency metric, and the like. As described above, any of a variety of algorithms can be used to calculate a path to an SR node, and thus this sub-TLV can indicate the type of algorithm used to calculate the path associated with the advertised SID, thus ensuring that all SR nodes use that same algorithm when calculating that path. This link state packet can be also be used to indicate whether the node sending the link state packet containing the sub-TLV supports SR.

The SR node transmits, at 230, the advertisement to one or more other nodes in the AS. In one embodiment, the SR uses one or more IGP messages to advertise the SID to one or more other SR nodes. In environments that include a mapping server, the SR node can transmit information identifying the SR node's SID to the mapping server and the mapping server can advertise the SID instead of or in addition to the SR node. The mapping server provides centralized management functions. Mapping servers can advertise SIDs for example, in domains that include non-SR capable nodes.

At 240, the SR node determines a strict SID. In one embodiment, a user determines that the SR node should be configured with a strict SID, and selects a strict SID to assign to the node. The selection can be performed in a manner similar to that described above with regard to determining a standard SID. That is, a particular algorithm or methodology can be used by the SR node to select a strict SID to assign to the SR node. The algorithm used to select the strict SID can be the same or different than that used to select the standard SID. In one embodiment, strict SIDs are selected from one range of SIDs and standard SIDs are selected from a separate range of SIDs. In another embodiment, both strict SIDs and standard SIDs are selected from a single range of SIDs. When mechanisms other than or in addition to the algorithm field are used to indicate whether a SID is a strict SID or a standard SID, SR nodes can use those mechanisms to differentiate strict SIDs from standard SIDs, thereby avoiding examination of the algorithm field. For example, if strict SIDs and standard SIDs are assigned from different ranges, an SR node can determine whether a SID is a strict SID or a standard SID just by examining the SID itself.

The SR node generates, at 250, an advertisement for the strict SID. This involves updating the advertisement to include the strict SID, as well as updating an algorithm field to include a value that indicates that the SID being advertised is a strict SID. For example, by setting the value of an algorithm variable in the corresponding sub-TLV of the advertisement to one, the SR node indicates that the SID in the advertisement is a strict SID. Any other value that is agreed upon can be used to designate strict SIDs and any other suitable mechanism for advertising the SID can be used.

The SR node, in one embodiment, also updates a field indicating whether the strict SID corresponds to a nodal segment. At 260, the SR node transmits the advertisement to one or more other SR nodes in the AS. In one embodiment, the SR uses one or more IGP messages to advertise the SID to one or more other SR nodes.

In some embodiments, the IGP can calculate paths to SR nodes using a variety of different algorithms. A default path-calculation algorithm (e.g., a Dijkstra shortest path rooted at the calculating node) may be used if no specific path-calculation algorithm is specified. If a path-calculation algorithm is specified for a particular path all SR nodes will use the same specified path-calculation algorithm when calculating that path. As described above, each SR node uses the path-calculation algorithm in order to identify the appropriate egress interface to add to its SR forwarding table for a given SID.

Examples of the different path-calculation algorithms that can be used to calculate a path to an SR node include Dijkstra algorithms rooted at the calculating node that have one or more of the following characteristics: use of an IGP metric; use of an IGP extended latency metric; bounds on a cumulative metric; exclusion of links with loss larger than a threshold; exclusion or inclusion of a set of one or more shared risk link groups (SRLGs); use of a set of affinities; and the like. In general, the path-calculation algorithms that can be used can include those used to calculate the shortest-path on any metric, those with bounds on metrics, those having non-cumulative metrics (e.g., such as those handling optical non-linear impairments), those used to calculate non-shortest paths, those enforcing disjointness based on SRLG and/or affinity, those enforcing inclusion based on SRLG and/or affinity, and the like. Thus, a node could advertise a SID along with a value indicating that the path-calculation algorithm used to compute the path associated with that SID is, for example, a Dijkstra rooted at the node on metric m2 with a bound on latency and exclusion of links with loss larger than a threshold and exclusion of SRLG 23.

In some embodiments, it may be desirable, from a traffic engineering standpoint, for there to be two (or more) different node segments leading to the same SR node. In such embodiments, that SR node can be assigned two different node SIDs (e.g., each of which can then be mapped to the same or different node prefix). In these situations, the distinct paths are each calculated using a different algorithm. Accordingly, another node can include multiple SIDs for segments leading to the same SR node in its SR forwarding table, but each of these SIDs may be associated with a different egress interface, which is identified using the specific algorithm used to calculate the respective segment identified by each SID. Furthermore, for each of the distinct paths, there can be both a standard SID and a strict SID.

One example of a situation in which it is desirable to have multiple node segments leading to the same SR node involves traffic between two continents. There may be two different undersea cables available to carry this traffic. As such, one node segment can be defined for a path using the first undersea cable (e.g., for standard customers' traffic) and another node segment can be defined for the path using the second undersea cable (e.g., for premium customers' traffic). The first path can be computed using a shortest path algorithm while the second can be computed using an algorithm that takes a latency metric into account. Multiple node segments leading to the same SR node can also be implemented for customers who desire to have multiple disjoint (non-overlapping) paths between customer locations. Here, algorithms that use different exclusion constraints can be used to calculate those disjoint paths.

Regardless of the algorithm used to calculate the shortest path, all standard SIDs (e.g., SIDs that are not strict SIDs) can be overridden by specific path routing performed by intermediate nodes along the path. By contrast, forwarding packets using strict SIDs, as denoted by setting the algorithm field to a value that indicates strict SPF forwarding is to be used when the strict SID is advertised, prevents PR overrides of the shortest path, regardless of the algorithm used by the IGP to calculate the path.

FIG. 3A shows example forwarding information maintained by an SR node, such as SR node 104 of FIG. 1. The forwarding information is shown as being maintained in a forwarding table 310, also referred to herein as the forwarding information base (FIB). The examples below regarding FIGS. 3A-3C refer to shortest path computations in the context of network 100. The assumption is made, for these examples, that the cost associated with each link in network 100 is the same as the cost for each other link in network 100.

Table 310 includes a column for destination SIDs. In response to receiving a packet, an SR node determines the destination SID for the packet, e.g., by examining the incoming packet. The active SID can be the top SID on a segment stack included in the packet's SR header, or can be otherwise designated, e.g., by use of a pointer. The SR node uses the destination SID to lookup a forwarding entry corresponding to the destination SID in the node's forwarding table. For packets received having a destination SID corresponding to one of the entries in the destination SID column, forwarding table 310 includes information identifying what the next hop for the SID should be, what segment routing stack operation should be performed, and what outgoing active SID should be included in the packet.

The destination SID column of forwarding table 310 includes information identifying both standard SIDs 16001-16006, and strict SIDs 16101-16106. In one example, if node A wishes to forward a packet toward the destination associated with SID 16005, which corresponds to node E of FIG. 1, node A forwards the packet to next hop node B and leaves the outgoing SID 16005.

As shown in FIG. 3A, forwarding table 310 has been modified by node A in order to achieve a specific path routing objective. In one embodiment, forwarding table 310 was generated by node A using standard shortest path forwarding, in which the next hop along a shortest path to each destination identified in the destination SID column is determined and that next hop is identified in the forwarding table entry corresponding to the destination SID. The forwarding table entry is also updated by node A to indicate the SR stack operation and outgoing active SID. After the initial set up of forwarding table 310, node A determines that specific path routing should be performed and updates one or more forwarding table entries. Specific path routing updates to forwarding table 310 can be performed at any time, e.g., prior to completion of initial setup of forwarding table 310, during the initial setup, or subsequent to the initial setup.

For example, as shown in forwarding table 310, when node A wishes to forward packets to node F, which corresponds to standard SID 16006, a specific path routing policy specified at node A mandates that the packets go through node D, rather than along the shortest path, which would be node A to node B to node F. One reason this specific path routing policy could be implemented is if node A wishes to avoid the link between node B and node F. To implement this specific path routing policy, forwarding table 310 is updated such that if node A has a packet having standard SID 16006, instead of forwarding the packet to node B with standard SID 16006 attached, which would result in the packet next being forwarded from node B to node F, node A instead pushes a segment stack onto the packet that causes the packet to be forwarded from node A to node B, from node B to node C, from node C to node D and then from node D to node F along the shortest path from node D to node F, which is node D, node E, node F. To implement the specific path routing policy that avoids the link between node B and node F, prior to forwarding a packet node F, node A can push the following segment stack onto the packet: {16004, 16006}. This causes the packet to be forwarded along the shortest path from node A to node D, and then along the shortest path from node D to node F. Were it not for implementing the specific path routing policy to avoid the link between node B and node F, node A would implement default shortest path forwarding by forwarding packets destined for node F with the SID 16006 in the active position. This would cause the packets to traverse the shortest path to node F, e.g., node A to node B, then node B to node F.

FIG. 3B shows forwarding table 350, which includes forwarding information maintained by node D, or SR node 112 of FIG. 1. Forwarding table 350 shows another example of specific path routing. In this case, the specific path routing, if implemented, will cause the objective discussed with regard to FIG. 3A, namely the objective of avoiding the link between node B and node F, to be frustrated. The forwarding table entry corresponding to standard destination SID 16006, shows that the next hop has been modified. That is, according to shortest path forwarding, node D should forward packets directed to node F to next hop E because the shortest path from node D to node F is via node E. However, in the example shown in FIG. 3B, node D's forwarding table that has been modified in accordance with specific path routing such that packets received at node D destined for node F are instead forwarded to next hop node C. This specific path routing policy contradicts default shortest path forwarding. Such a policy could be implemented, for example, in response to a user configuring node D to avoid the link between node E and node F. However, if node D forwards packets destined for node F to node C instead of to node E (as would be mandated by shortest path forwarding), those packets will be forwarded by node C along the shortest path the node F. This path traverses node C to node B, then node B to node F. Forwarding the packet along the link between node B and node F frustrates the specific path routing policy implemented by node A, which was to avoid that link.

To prevent such conflicts, node A can implement its specific path routing policy using strict SIDs. This is shown in forwarding table 315 of FIG. 3C. Instead of pushing a segment stack including SIDs 16004 and 16006 onto packets intended for node F, as shown in FIG. 3A, node A updates forwarding table 315 to indicate that if node A wishes to forward packets to a destination corresponding to SID 16006, that is, node F, node A should push a segment stack having strict SIDs 16104 and 16106. This causes packets to be forwarded to node D and then node F along the shortest path, and does not permit any specific path routing undertaken by intermediate nodes along that path to override the shortest path of calculations. That is, if node D receives a packet intended for node F, as indicated by the active destination SID, if the active destination SID is a strict SID, e.g., 16106, the instruction in forwarding table 350 of FIG. 3B indicates that the packet is to be forwarded to next hop node E. So when specific path routing at node D updates forwarding table 350 to indicate that packets destined for node F should be forwarded to node C instead of along the shortest path (to node E), node D updates the entry for node F corresponding to the standard SID 16006, but not for the strict SID 16106. Thus, if node A wishes to ensure that its policy is not subsequently overridden by intermediate nodes, node A can use strict SIDs rather than standard SIDs.

Figure 4:
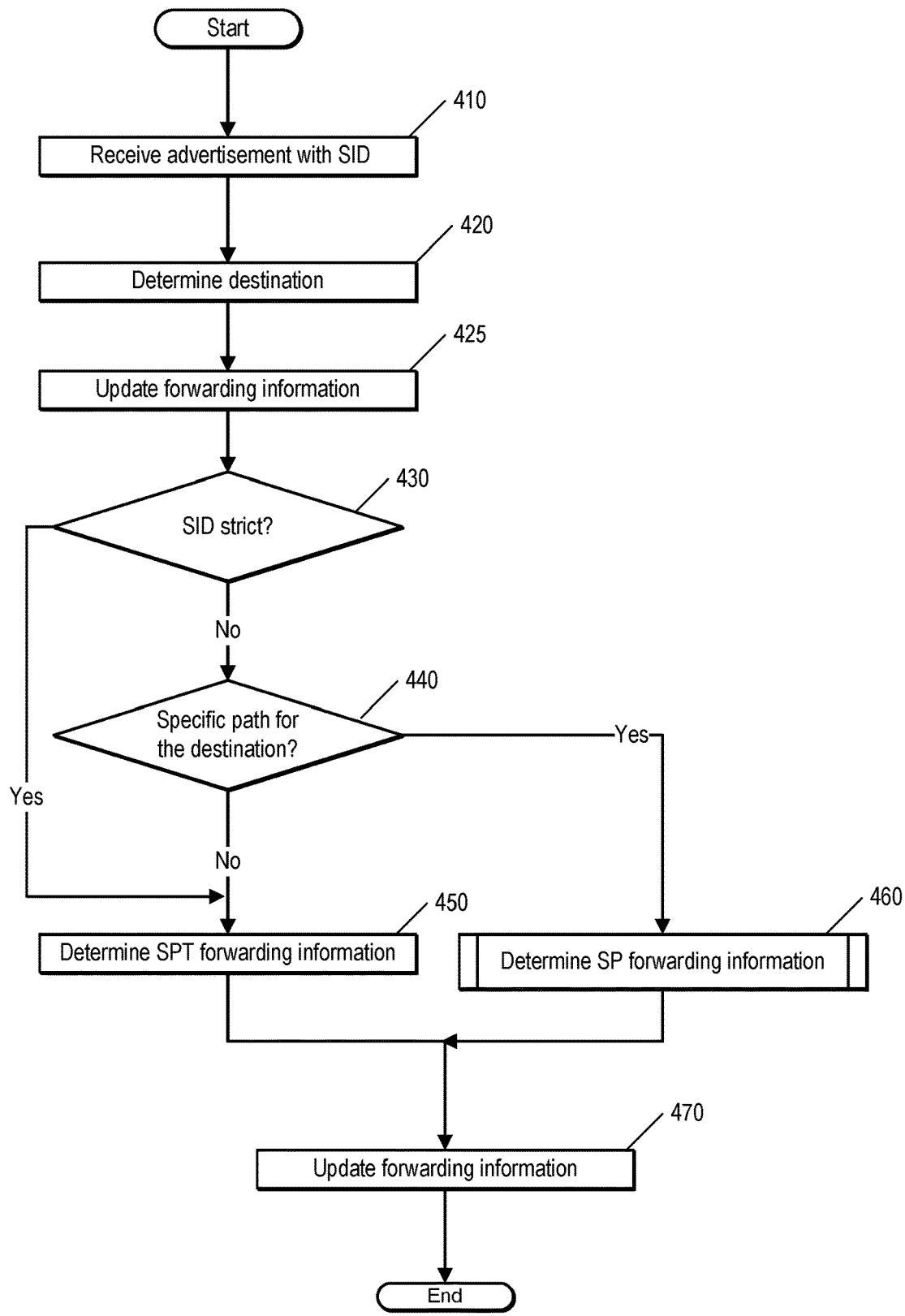
FIG. 4 is a flow chart illustrating an example process, according to one embodiment.

FIG. 4 is a flow chart showing a method of setting up a segment routing forwarding table, such as segment routing forwarding table 315 of FIG. 3C. In one embodiment, the method is performed by a node, such as SR enabled node

104 of FIG. 1. At 410, the node receives an advertisement that includes a SID. In one embodiment, the advertisement is received via an IGP or BGP message.

At 420, the node determines a destination associated with the advertisement. That is, the node determines which SR node is associated with the SID included in the advertisement. At 425, the SR node updates routing information and/or forwarding information. In one embodiment, updating forwarding information involves the node determining whether the entry for the destination already exists in the node's forwarding table. If no entry exists, the node creates an entry for the destination and updates the SID field to indicate that the received SID is associated with the destination. In one embodiment, this involves determining whether the SID is a standard SID or a strict SID and updating the appropriate entry in the forwarding table. If an entry for the destination already exists, the SR node likewise determines whether the advertised SID is a standard SID or a strict SID, and updates the appropriate entry. Determining the whether the SID is a standard SID or a strict SID involves, in one embodiment, reading the algorithm field of the advertisement and determining the value stored therein. In one embodiment, if the value is 1, the SID is a strict SID. If the value is 0, the SID is a standard SID.

At 430, the node determines whether the SID is a strict SID. If so, the node will forward packets to the destination associated with the strict SID according to the shortest path decision for that destination, regardless of any specific path routing policies that may be implemented by the node. That is, the node determines, at 450, the next hop along the shortest path toward the destination associated SID. The node updates, at 470, forwarding information, such as forwarding table 415 of FIG. 4C to indicate the next hop to which packets carrying the advertised SID should be forwarded.

If the node determines at 430 that the SID is not a strict SID, specific path routing can be implemented for the SID. At 440, the node determines whether the node has been configured to implement specific path routing for the advertised SID. In one embodiment, this determination involves identifying whether instructions for identifying a specific path associated with the SID have been received, for example, from a user. Such instructions can be automatically generated. If the SR node determines, at 440, that a specific path should be taken for the advertised SID, the SR node determines the specific path forwarding information at 460. Additional details regarding 460 are discussed with regard to FIG. 5. If no specific path is associated with the destination, the node uses, by default, shortest path forwarding information, as determined at 450. At 470, the node updates the forwarding information.

Figure 5:
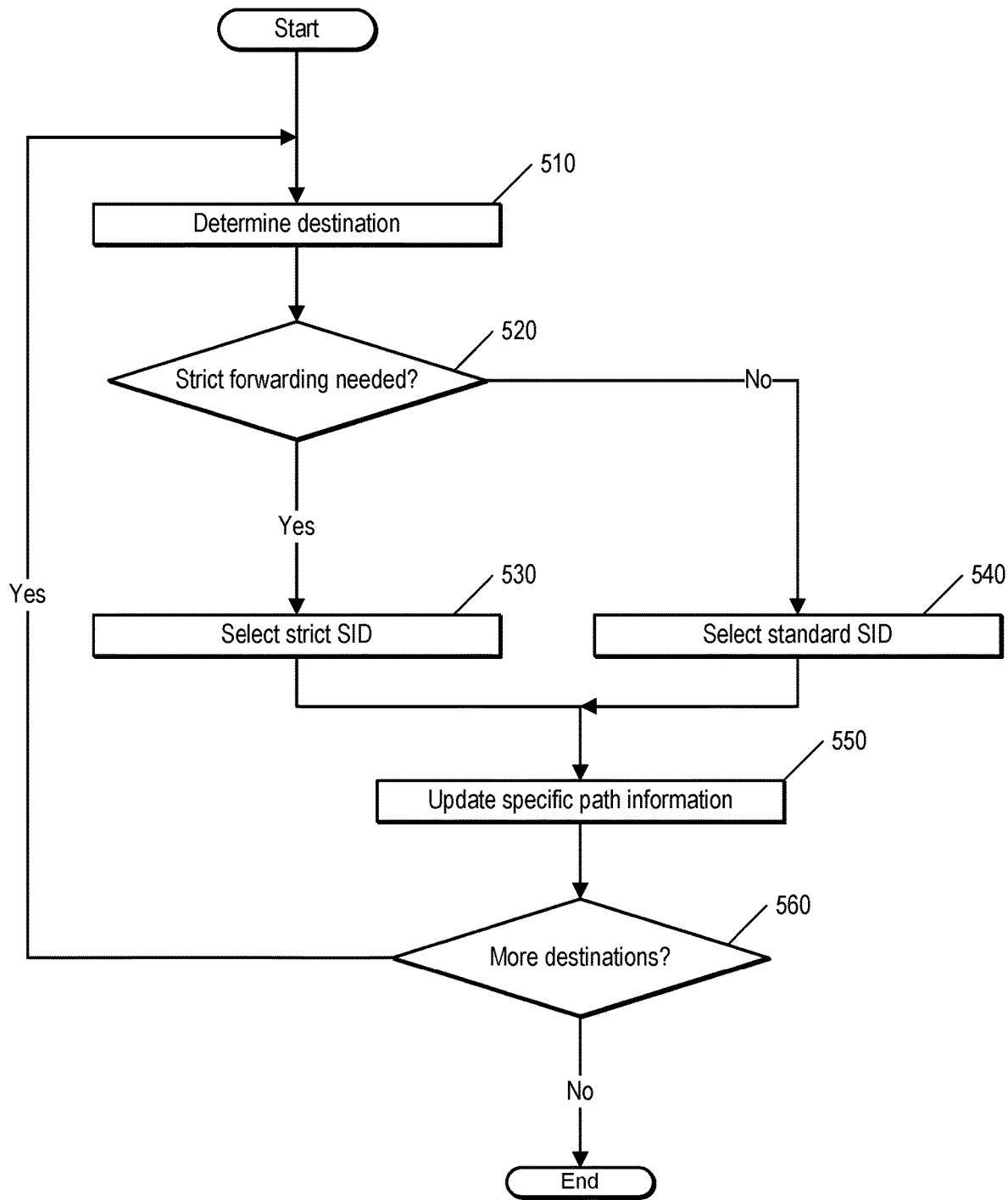
FIG. 5 is a flow chart illustrating an example process, according to one embodiment.

FIG. 5 shows additional details of determining specific path forwarding information. In one embodiment, FIG. 5 can be performed by a node, such as SR enabled node 104 of FIG. 1. In one embodiment, the specific path is specified, e.g., by a user, as a list of destinations. A list of destinations can be represented as one or more node identifiers, such as prefixes, or as one or more SIDs.

At 510, the node determines a destination specified in the specific path. At 520, the node determines whether strict forwarding is desired for the destination. In one embodiment, the user specifies whether the user wishes to encode some or all of the specific path using strict SIDs. If the node determines at 520 that strict forwarding should be used, the node identifies a strict SID associated with the destination, at 530. In one embodiment, this involves accessing routing information and/or forwarding information, such as a forwarding table. If the node determines, on the other hand, that strict forwarding is not needed, the node selects, at 540, a standard SID corresponding to the destination. In one embodiment, selecting a standard SID involves accessing the forwarding table.

At 550, the node updates specific path information. The specific path information can be stored in memory, e.g., in a table. In one embodiment, the specific path information is implemented as a segment stack. In this case, 550 involves the node adding the SID to a segment stack. At 560, the node determines whether more destinations are included in the specific path. If so, the method returns to 510, and the next destination in the specific path is selected.

Figure 6:
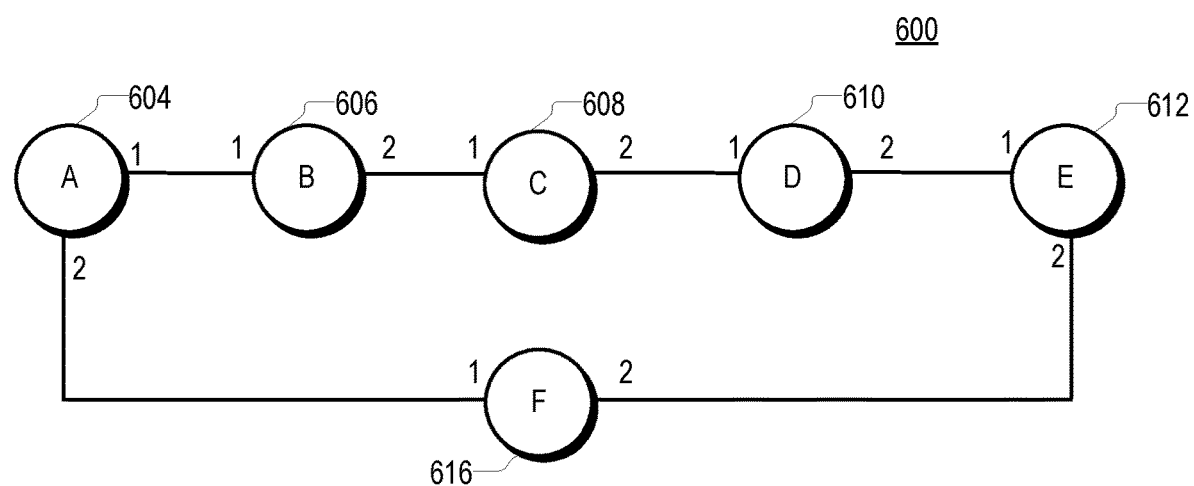
FIG. 6 is a block diagram illustrating an example network, according to one embodiment.

FIG. 6 shows an example of a portion of a segment routing (SR) enabled network 600. Network 600 consists of nodes 604-616. Nodes 604-616 are implemented as SR nodes, which are nodes that are configured to employ SR. Each of the nodes 604-616 have interfaces that are identified as shown. For example, node 604 has two interfaces designated 1 and 2, respectively. Each of the nodes 604-616 is assigned a node prefix that is unique within network 600. Node prefixes A-F are provided for nodes 604-616, respectively. These node prefixes are unique within network 600. Nodes 604-616 can also assign locally significant adjacency segment IDs and/or service segment IDs. Data, such as packets, flow between nodes along segment switched paths (SSPs). An SSP can be represented by a segment list. The segment list is inserted into a packet's header, and packets are forwarded along the nodes identified in the segment list. When a specific path is specified for a packet, the specific path is encoded in a segment list.

Nodes 604-616 are assigned unique prefix SIDs. SIDs 16001-16006 are standard prefix SIDS, referred to herein as standard SIDs. Nodes 604-616 are also assigned unique strict SIDs 16701-16706. Standard SIDs and strict SIDS are unique within the network, such that each standard SID and each strict SID is assigned to no more than one node and is a different value from every other standard SID and strict SID. Both standard SIDs and strict SIDs can be implemented as node SIDs. In some embodiments, a user, such as a network administrator, detects a node coming online or joining a network and assigns the node a standard SID and a strict SID.

As described above with regard to FIG. 1, nodes advertise the SIDs assigned to them to other nodes. In response to receiving the advertised SIDs, a node updates routing information and forwarding information. The routing information and forwarding information associate a node's prefix with the SID(s) advertised by the node. The information can be used, e.g., by an ingress router, to create an SR header for forwarding a packet to a particular destination. For example, if the ingress router received a packet with an IP prefix in the destination address field, the ingress router could look up the IP prefix in the routing information and/or the forwarding information to determine which SIDs are associated with the IP prefix. The ingress router can encapsulate the packet with an SR header including a SID corresponding to the prefix and forward the packet into an SR network. Intermediate nodes (e.g., nodes between the ingress router and the node corresponding to the IP prefix) forward packets having such a header towards the node using SR forwarding tables, as discussed below.

As will be described with regard to FIG. 600, SR offers the ability to create tunnels from one node to another, without any other protocol than ISIS or OSPF. LDP and RSVP-TE signaling protocols are not required. A specific path is determined, e.g., by a path computation element (PCE) or user, from any SR node to any other SR node, and the SR control plane automatically builds tunnels between the SR nodes. The SR node at which a tunnel originates is referred to as a head-end node. The SR node at which the tunnel terminates is referred to as a tail-end node. SR tunnels constitute several SR nodes that create a path between the head-end and tail-end nodes. In one embodiment, a tunnel is implemented as a stack of SIDs corresponding to one or more of the SR nodes along a path between a head-end node and a tail-end node.

In FIG. 6, node 604 can implement a tunnel, for example, to node 612. The tunnel traverses intermediate nodes 606, 608, and 610. Node A can ensure that traffic between node 604 and node 612 follows the specific path and traverses nodes 606, 608, and 610 using a tunnel. Consider the example in which the link between 610 and node 612 is relatively high cost. In this situation, if node 610 forwarded the tunneled traffic to node 612, the shortest path from node 610 to node 612 might instead be via node 616, rather than directly from node 610 to node 612.

A tunnel can be implemented as a stack of SIDs. For example, FIG. 7A shows an example segment stack 710. The segment stack, when used by a node, such as SR node 604 of FIG. 6, to encapsulate packets causes those packets to traverse a tunnel from SR node 604 to SR node 612. The segment stack includes three SIDs. The first, 16003, represents a standard SID corresponding to SR node 608. The next, 24034, represents an adjacency SID corresponding to the link between SR node 608 and SR node 610. The third SID, 16005, is a standard SID corresponding to SR node 612. The segment stack shown in FIG. 7A is one example. Such segment stacks can include more or fewer SIDs and can include more or fewer types of SIDs.

In operation, packets forwarded from SR node 604 with this segment stack will be forwarded from SR node 604 out interface 1 to SR node 606. SR node 606 examines the active SID, namely 16003, and takes the appropriate action. In this case, the appropriate action is to continue a packet without modifying segment stack, and forwarding the packet out interface 2 to SR node 608. SR node 608, in response to receiving a packet having SID 16003 in the active position, recognizes itself as the destination for that SID, and pops the SID from the top of the SID stack. As the next SID (24034) in the SID stack corresponds to an adjacency segment from SR node 608 to SR node 610, SR node 608 pops or removes the adjacency SID from the SID stack, and forwards the packet out interface 2 to SR node 610. SR node 610, in response to detecting that the SID in the active position corresponds to SR node 612, forwards the packet out interface 2 to SR node 612. In one embodiment, SR node 610 first removes a SID corresponding to SR node 612. In this way, a specific path from SR node 604 to SR node 612 that necessarily traverses the link between SR nodes 608 and 610, can be implemented. In one embodiment, SR node 604 is configured to determine, for each packet it receives, whether a tunnel exists corresponding to the packet's destination, and if so, to forward the packet into the tunnel, regardless of whether or not doing so causes the packet to traverse the shortest path to the packet's destination. This preference for forwarding via a tunnel when a tunnel is available represents an example of specific path routing.

In some cases, this specific path routing leads to problems. For example, if the link between SR node 610 and SR node 612 fails, or significantly increases in cost, the intermediate nodes of the tunnel, which are unaware of the tunnel, will cause the packets to be forwarded back to SR node 604. However, SR node 604, having been configured to always forward such packets to the tunnel, once again appends the SID stack corresponding to the tunnel to the packet and forwards the packet back into the tunnel. This creates a loop.

FIG. 7B shows an example SR forwarding table in which specific path routing is used to specify that SR node 604 should always forward packets having destination addresses corresponding to SR nodes 610 and 612 via Tunnel T1, using a segment stack as described with regard to FIG. 7A. If specific path routing were not implemented to prefer the tunnel, shortest path determinations would indicate that node A forward packets addressed to SR node 612 toward SR node 616. However, as shown in the SR forwarding table entries corresponding to 16004 and 16005, when SR node 604 receives a packet having one of these destination SIDs as the active SID, the SR node pushes the segment stack corresponding to the tunnel onto the packet and forwards the packet out interface 1 towards SR node 606, rather than towards SR node 616.

FIG. 7C shows an example segment stack 730. Example segment stack 730 is implemented using strict SIDs. Strict SIDs can be used to prevent packets, such as packets that are sent back by an intermediate node of a tunnel toward the head end of the tunnel, from being introduced or reintroduced into the tunnel by the head end. A packet that is redirected to the head end of a tunnel by, for example, one of the intermediate nodes of the tunnel, prior to reaching the tail-end of the tunnel, will likely include at least one SID from the SID stack that defines the SR tunnel. If the SID stack that defines the SR tunnel is implemented with strict SIDs, the head-end node, in response to receiving the redirected packet, which has a strict SID as the active SID, forwards the packet along the shortest path to the active strict SID, rather than overriding the shortest path forwarding decision by forwarding the packet into the tunnel.

FIG. 7D shows an example forwarding table maintained by a node such SR node 604 of FIG. 6. As can be seen from forwarding table 740, SR node 604 has been configured such that packets received for example, from a customer edge (CE) node (not shown) having as an active SID 16004 or 16005 should be steered into the tunnel. This involves pushing the segment stack corresponding to the tunnel onto the packet and forwarding the packet toward SR node 606. In this example, the SID stack is made up of strict SIDs and adjacency SIDs only.

Figure 8:
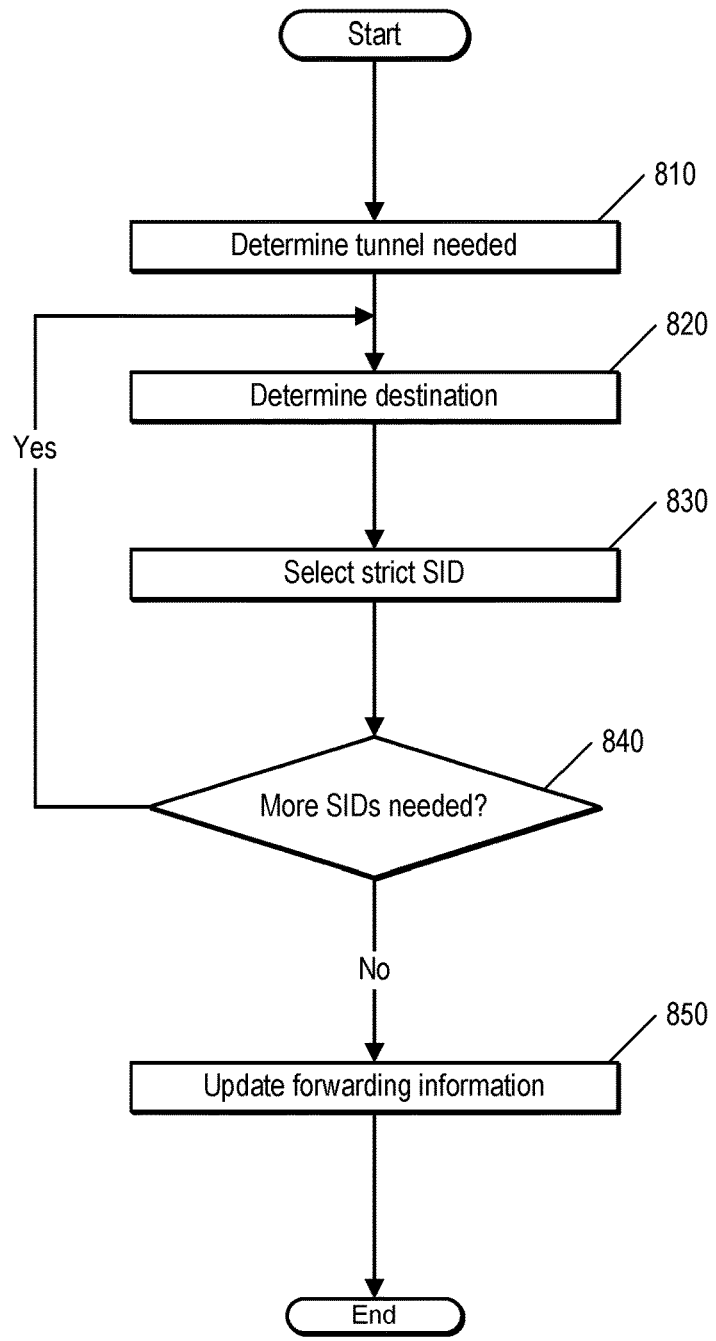
FIG. 8 is a flow chart illustrating an example process, according to one embodiment.

FIG. 8 shows a method of setting up a segment routing tunnel using strict SIDs. In one embodiment, FIG. 8 is performed by a node, such as SR node 604 of FIG. 6. At 810, the node determines that a tunnel is needed. In one embodiment, this is performed by a user or automatically performed, e.g., by a PCE. For example, the user determines that traffic should be routed according to a specific path.

At 820, the node determines a first destination associated with the tunnel. In one embodiment, this is the tunnel tail-end. In another embodiment, the destination represents an intermediate node on the tunnel. The node determines, at 830, whether a strict SID exists for the destination. In response to determining that a strict SID associated with the determined destination exists, the node selects the strict SID and updates a segment stack corresponding to the tunnel. In one embodiment, one or more adjacency SIDs can be used.

At 840, the node determines whether more SIDs are needed. That is, the node determines whether the segment stack reaches the tail end of the tunnel. If no more SIDs are needed, that is, if the tunnel has reached the tail end, the node updates forwarding information at 850. For example, the node stores in memory the segment stack and information identifying a node or nodes, in particular, the SIDs associated with those nodes, for which packets addressed to the nodes should be forwarded into the tunnel.

Figure 9:
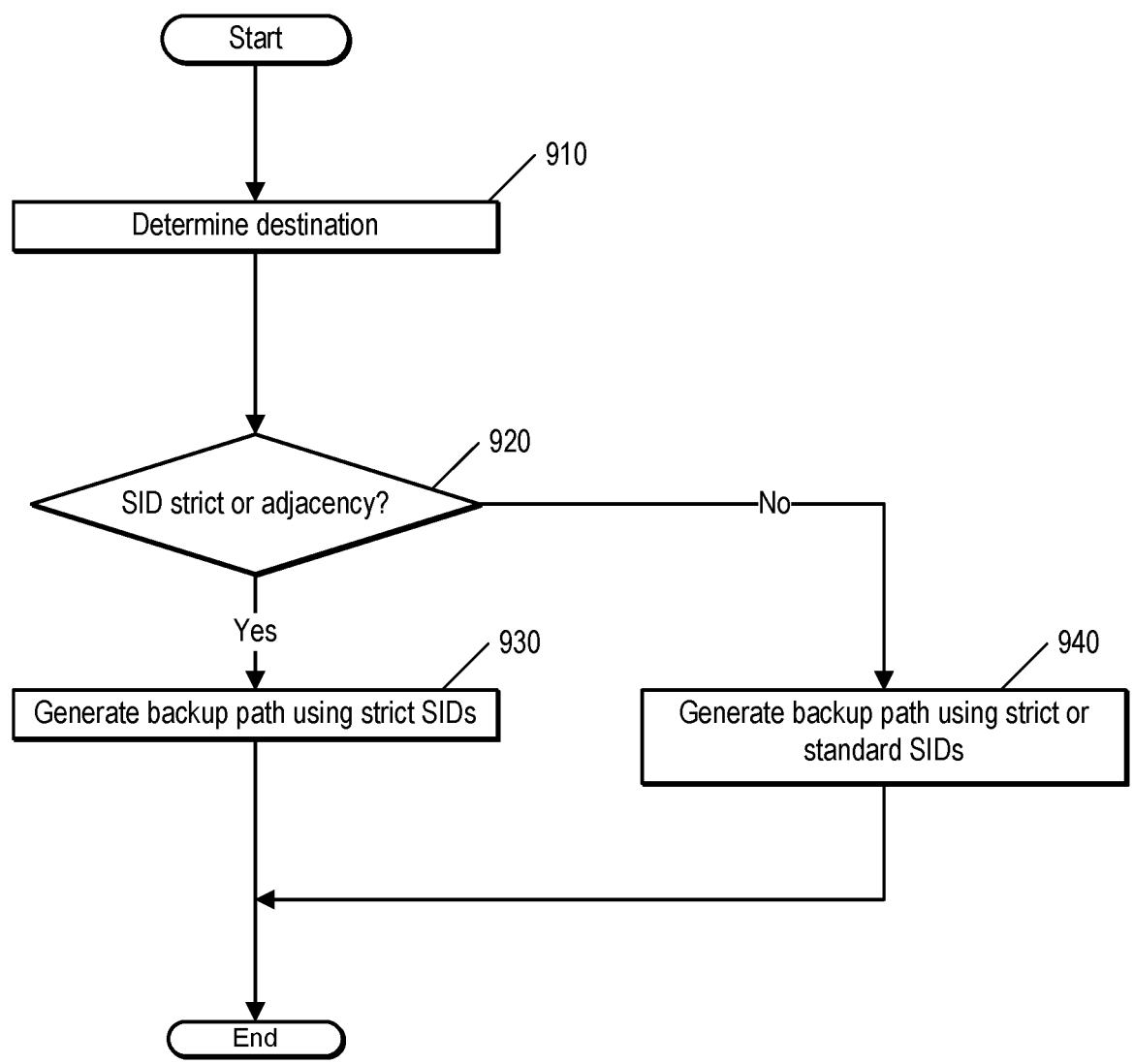
FIG. 9 is a flow chart illustrating an example process, according to one embodiment.

FIG. 9 illustrates a method of configuring a backup path. In one embodiment, the method is performed by a node, such as SR node 608 of FIG. 6. Backup paths can be used to protect against node and/or link failures. In one embodiment, paths associated with strict SIDs and adjacency SIDs are protected using strict SIDs. That is, use of a standard SID to protect a strict SID is prevented. At 910, the SR node determines a destination for which a backup path is desired. For example, the node determines that a backup path should be created to protect against a failure of the node's next-hop neighbor.

At 920, the node determines if a SID corresponding to a path to the next-hop neighbor is a strict SID or an adjacency SID. If so, the SR node generates a backup path to protect the next-hop neighbor using strict SIDs.

If the node or link being protected is represented by a standard SID, as opposed to a strict SID or an adjacency SID, standard SIDs can be used to generate backup paths to protect against failure in those situations. This is shown at 940, where the node generates a backup path using strict or standard SIDs.

Figure 10:
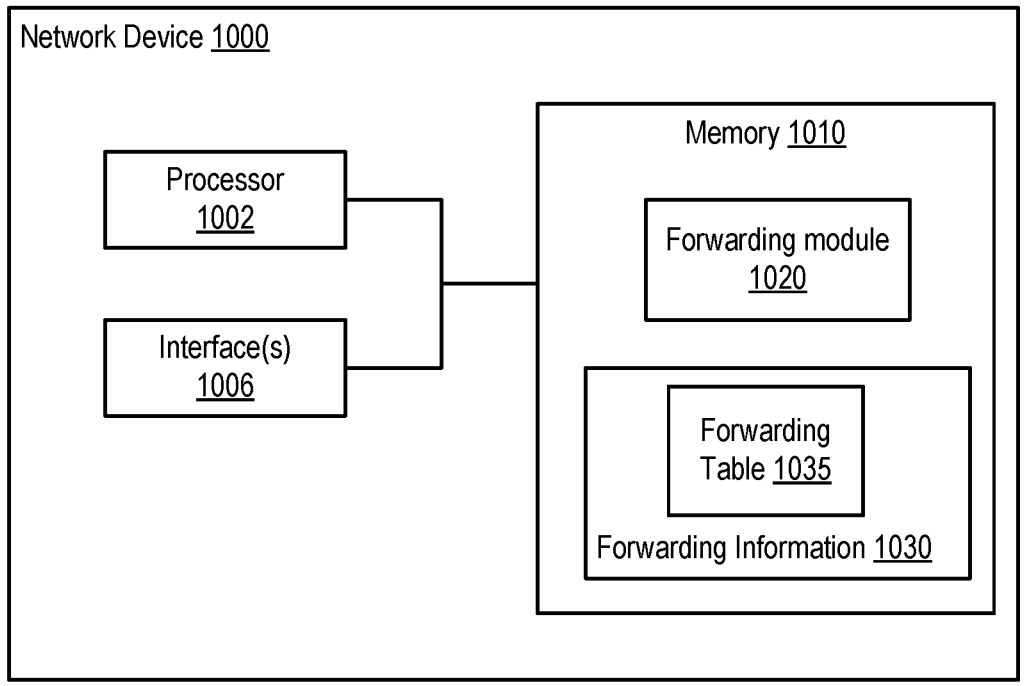
FIG. 10 is a block diagram illustrating certain components of an example network device, according to one embodiment.

FIG. 10 is a block diagram illustrating certain components of a network device that can be associated with a node in one of the networks described herein. Network device 1000 can, for example, be associated with a node in network 100 of FIG. 1. In the embodiment of FIG. 10, network device 1000 includes a processor 1002, one or more interfaces 1006, and a memory 1010. Memory 1010 includes forwarding module 1020 and forwarding information 1030, which includes a forwarding table 1035. In one embodiment, interface 1006 is configured both for sending and receiving messages within a network and for sending and receiving control information, either between network nodes or between the network device and a controller. Interface 1006 can include either or both of one or more physical interfaces or logical interfaces.

In the embodiment of FIG. 10, forwarding table 1035 includes one or more SR forwarding tables. In the embodiment of FIG. 10, communication over interface 1006 is handled via forwarding module 1020. Forwarding module 1020 is configured to forward messages using stored forwarding information 1030. Forwarding information 1030 is used by forwarding module 1020.

Figure 11:
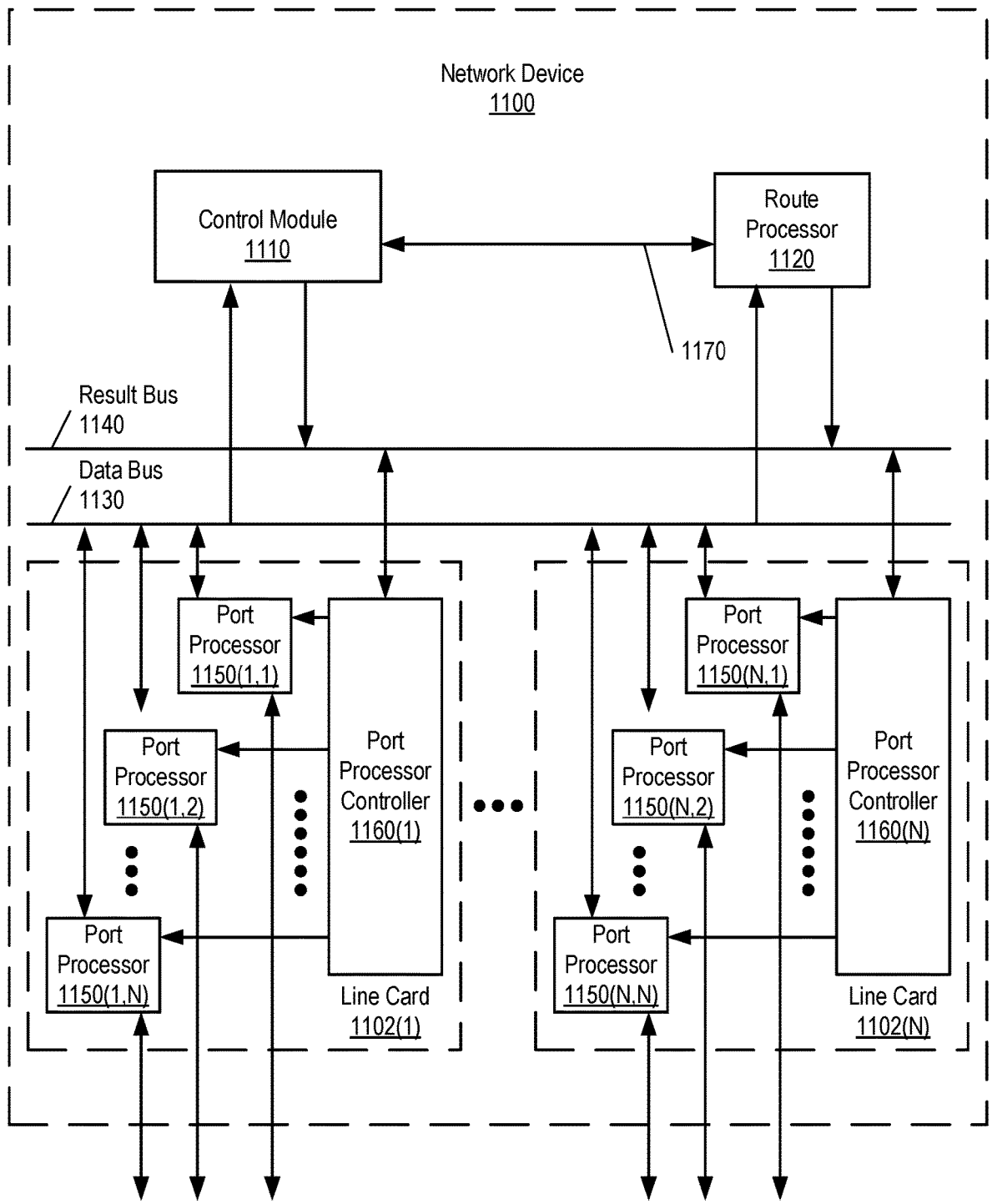
FIG. 11 is a block diagram illustrating certain components of an example node, according to one embodiment.

FIG. 11 is a block diagram illustrating certain additional and/or alternative components of nodes that can be employed in the networks described herein. In this depiction, node 1100 includes a number of line cards (line cards 1102(1)-(N)) that are communicatively coupled to a forwarding engine or packet forwarder 1110 and a processor 1120 via a data bus 1130 and a result bus 1140. Line cards 1102(1)-(N) include a number of port processors 1150(1, 1)-(N, N) which are controlled by port processor controllers 1160(1)-(N). It will also be noted that forwarding engine 1110 and processor 1120 are not only coupled to one another via data bus 1130 and result bus 1140, but are also communicatively coupled to one another by a communications link 1116.

The processors 1150 and 1160 of each line card 1102 may be mounted on a single printed circuit board. When a packet or packet and header are received, the packet or packet and header may be identified and analyzed by router 1100 in the following manner Upon receipt, a packet (and/or some or all of its control information) or packet and header is sent from the one of port processors 1150(1, 1)-(N, N) at which the packet or packet and header was received to one or more of those devices coupled to data bus 1130 (e.g., others of port processors 1150(1, 1)-(N, N), forwarding engine 1110 and/or processor 1120). Handling of the packet or packet and header can be determined, for example, by forwarding engine 1110. For example, forwarding engine 1110 may determine that the packet or packet and header should be forwarded to one or more of port processors 1150(1, 1)-(N, N). This can be accomplished by indicating to corresponding one(s) of port processor controllers 1160(1)-(N) that the copy of the packet or packet and header held in the given one(s) of port processors 1150(1,1)-(N,N) should be forwarded to the appropriate one of port processors 1150(1,1)-(N,N). In addition, or alternatively, once a packet or packet and header has been identified for processing, forwarding engine 1110, processor 1120 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 12:
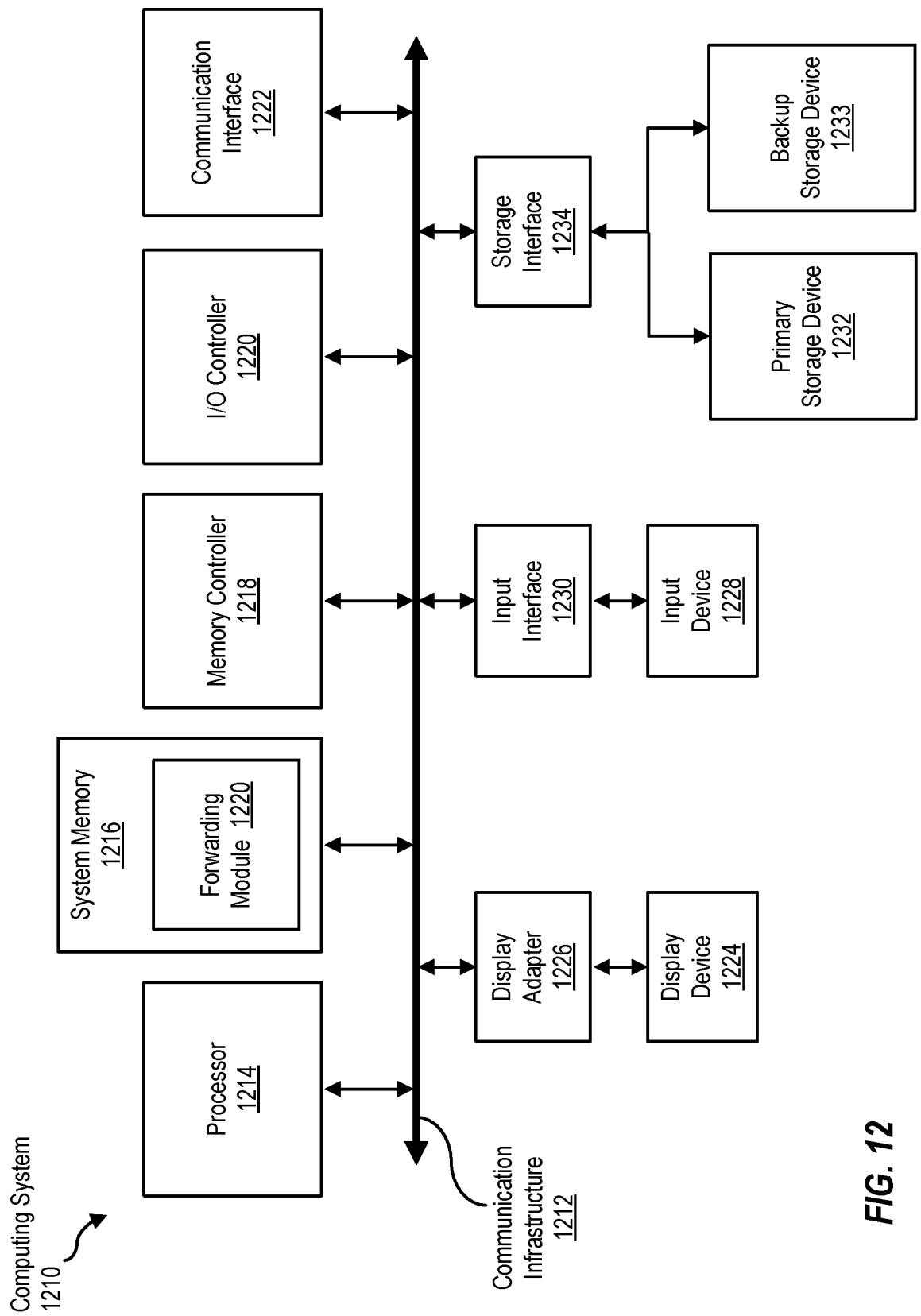
FIG. 12 is a block diagram illustrating certain components of a computing system, according to one embodiment.

FIG. 12 is a block diagram of a computing device, illustrating, for example, implementation of a forwarding module in software as described above. Computing system 1210 broadly represents any single or multi-processor computing device or system capable of executing computer-readable instructions. Examples of computing system 1210 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1210 may include at least one processor 1214 and a system memory 1216. By executing the software that implements a forwarding module 1217, computing system 1210 becomes a special purpose computing device that is configured to perform packet forwarding, in the manner described above.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the embodiments described and/or illustrated herein. For example, processor 1214 may perform and/or be a means for performing the operations described herein. Processor 1214 may also perform and/or be a means for performing any other operations, methods, or processes described and/or illustrated herein.

System memory 1216 generally represents any type or form of volatile or non-volatile storage device or medium capable of storing data and/or other computer-readable instructions. Examples of system memory 1216 include, without limitation, random access memory (RAM), read only memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described in detail below). In one example, program instructions executable to implement a forwarding module configured to forward multicast data packets may be loaded into system memory 1216.

In certain embodiments, computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1212. In certain embodiments, memory controller 1218 may perform and/or be a means for performing, either alone or in combination with other elements, one or more of the operations or features described and/or illustrated herein. I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 12054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1222 may also allow computing system 1210 to engage in distributed or remote computing. For example, communication interface 1222 may receive instructions from a remote device or send instructions to a remote device for execution. As illustrated in FIG. 12, computing system 1210 may also include at least one display device 1224 coupled to communication infrastructure 1212 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1212 (or from a frame buffer) for display on display device 1224.

As illustrated in FIG. 12, computing system 1210 may also include at least one input device 1228 coupled to communication infrastructure 1212 via an input interface 1230. Input device 1228 generally represents any type or form of input device capable of providing input, either computer or human generated, to computing system 1210. Examples of input device 1228 include, without limitation, a keyboard, a pointing device, a speech recognition device, or any other input device.

As illustrated in FIG. 12, computing system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of computing system 1210. A storage device like primary storage device 1232 can store information such as routing tables and forwarding tables.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12.

Computing system 1210 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1210 for storage in memory via a network such as the Internet or upon a carrier medium.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1210 may be configured as an application specific integrated circuit (ASIC) adapted to implement one or more of the embodiments disclosed herein.

Although the present disclosure describes several embodiments, the disclosure is not intended to be limited to the specific forms set forth herein. On the contrary, it is intended to cover such alternatives, modifications, and equivalents as can be reasonably included within the scope of the invention as defined by any associated claims.

What is claimed is:

1. A method comprising:
   determining a strict segment identifier (strict SID), wherein
      the strict SID requires that a strict shortest path is used for a segment corresponding to the strict SID, and
      the strict SID is determined by a first node;
   generating an advertisement, wherein
      the advertisement comprises a segment identifier (SID), and
      the SID is the strict SID; and
   transmitting the advertisement to a second node.

2. The method of claim 1, wherein
   the advertisement comprises an interior gateway protocol (IGP) message comprising a populated algorithm field, wherein
      the populated algorithm field indicates that the SID is a strict SID, and
      the populated algorithm field is configured to be used by the second node to determine whether the SID is a strict SID.

3. The method of claim 1, wherein
   the second node is associated with specific path information that specifies a default path to a destination node,
   the strict shortest path is different than the default path, and
   the default path does not comprises a shortest path to the destination node.

4. The method of claim 1, further comprising:
   updating forwarding information to include the information identifying the strict shortest path, wherein
      the shortest path terminates at a destination node; and
      the forwarding information includes another SID associated with the destination node.

5. The method of claim 1, further comprising:
   generating a second advertisement that includes a second SID associated with a destination node, wherein
      the second advertisement comprises a standard SID,
      the standard SID identifies a different path than the a strict shortest path identified by the strict SID, and
      the strict shortest path and the different path both terminate at the destination node; and
   transmitting the second advertisement to the second node, wherein
      the second advertisement can be transmitted to the second node either before, after, or substantially simultaneously to the first advertisement being transmitted to the second node.

6. The method of claim 1, wherein
   the strict shortest path comprises one or more strict SIDs.

7. The method of claim 1, wherein
   the strict shortest path comprises a tunnel that comprises one or more strict SIDs.

8. A system comprising:
   a first node configured to perform a method comprising:
      determining a strict segment identifier (strict SID), wherein
         the strict SID requires that a strict shortest path is used for a segment corresponding to the strict SID, and
         the strict SID is determined by a first node;
      generating an advertisement, wherein
         the advertisement comprises a segment identifier (SID), and
         the SID is the strict SID; and
      transmitting the advertisement to a second node.

9. The system of claim 8, wherein
   the advertisement comprises an interior gateway protocol (IGP) message comprising a populated algorithm field, wherein
      the populated algorithm field indicates that the SID is a strict SID, and
      the populated algorithm field is configured to be used by the second node to determine whether the SID is a strict SID.

10. The system of claim 8, wherein
    the second node is associated with specific path information that specifies a default path to a destination node,
    the strict shortest path is different than the default path, and
    the default path does not comprises a shortest path to the destination node.

11. The system of claim 8, wherein the method further comprises:
    updating forwarding information to include the information identifying the strict shortest path, wherein
       the shortest path terminates at a destination node; and
       the forwarding information includes another SID associated with the destination node.

12. The system of claim 8, wherein the method further comprises:
    generating a second advertisement that includes a second SID associated with a destination node, wherein
       the second advertisement comprises a standard SID,
       the standard SID identifies a different path than the a strict shortest path identified by the strict SID, and
       the strict shortest path and the different path both terminate at the destination node; and transmitting the second advertisement to the second node, wherein
the second advertisement can be transmitted to the second node either before, after, or substantially simultaneously to the first advertisement being transmitted to the second node.

13. The system of claim 8, wherein
the strict shortest path comprises one or more strict SIDs.

14. The system of claim 8, wherein
the strict shortest path comprises a tunnel that comprises one or more strict SIDs.

15. A non-transitory computer readable storage medium comprising program instructions executable by one or more processors to perform a method comprising:
determining a strict segment identifier (strict SID), wherein
the strict SID requires that a strict shortest path is used for a segment corresponding to the strict SID, and
the strict SID is determined by a first node;
generating an advertisement, wherein
the advertisement comprises a segment identifier (SID), and
the SID is the strict SID; and
transmitting the advertisement to a second node.

16. The non-transitory computer readable storage medium of claim 15, wherein
the advertisement comprises an interior gateway protocol (IGP) message comprising a populated algorithm field, wherein
the populated algorithm field indicates that the SID is a strict SID, and
the populated algorithm field is configured to be used by the second node to determine whether the SID is a strict SID.

17. The non-transitory computer readable storage medium of claim 15, wherein
the second node is associated with specific path information that specifies a default path to a destination node,
the strict shortest path is different than the default path, and
the default path does not comprises a shortest path to the destination node.

18. The non-transitory computer readable storage medium of claim 15, wherein the method further comprises:
updating forwarding information to include the information identifying the strict shortest path, wherein
the shortest path terminates at a destination node; and
the forwarding information includes another SID associated with the destination node.

19. The non-transitory computer readable storage medium of claim 15, wherein the method further comprises:
generating a second advertisement that includes a second SID associated with a destination node, wherein
the second advertisement comprises a standard SID,
the standard SID identifies a different path than the a strict shortest path identified by the strict SID, and
the strict shortest path and the different path both terminate at the destination node; and
transmitting the second advertisement to the second node, wherein
the second advertisement can be transmitted to the second node either before, after, or substantially simultaneously to the first advertisement being transmitted to the second node.

20. The non-transitory computer readable storage medium of claim 15, wherein
the strict shortest path comprises one or more strict SIDs.

* * * * *